United States Patent [19]
Mitchell et al.

[11] Patent Number: 5,641,587
[45] Date of Patent: Jun. 24, 1997

[54] BATTERY PACK WITH A MONITORING CIRCUIT FOR A KNOWN SYSTEM

[75] Inventors: Nathan Austin Mitchell, The Woodlands; Joseph F. Freiman, Cypress; Steven Kent McConkey, Houston, all of Tex.

[73] Assignee: Compaq Computer Corporation, Houston, Tex.

[21] Appl. No.: 573,296

[22] Filed: Dec. 15, 1995

[51] Int. Cl.$^6$ .............................. H01M 10/48; H02J 7/04
[52] U.S. Cl. .................. 429/90; 429/91; 429/96; 320/33; 320/39; 320/49
[58] Field of Search ........................ 429/90, 91, 96, 429/97, 7; 320/9, 13, 29, 31, 33, 39, 45, 47, 49

[56] References Cited

U.S. PATENT DOCUMENTS

| | | | |
|---|---|---|---|
| 4,153,867 | 5/1979 | Jungfer et al. | 320/43 |
| 4,413,221 | 11/1983 | Benjamin et al. | 320/48 |
| 4,651,081 | 3/1987 | Nishimura et al. | 320/61 |
| 4,724,528 | 2/1988 | Eaton | 364/715 |
| 4,775,827 | 10/1988 | Ijntema et al. | 320/44 |
| 4,803,416 | 2/1989 | Abiven et al. | 320/44 |
| 4,977,393 | 12/1990 | Arnold et al. | 340/636 |
| 5,012,176 | 4/1991 | LaForge | 320/31 |
| 5,204,611 | 4/1993 | Nor et al. | 320/21 |
| 5,218,288 | 6/1993 | Mickal et al. | 320/48 |
| 5,315,228 | 5/1994 | Hess et al. | 320/31 |
| 5,363,312 | 11/1994 | Ninomiya | 364/483 |
| 5,399,446 | 3/1995 | Takahashi et al. | 429/90 |
| 5,477,130 | 12/1995 | Hashimoto et al. | 429/96 X |
| 5,514,946 | 5/1996 | Lin et al. | 320/31 |
| 5,518,835 | 5/1996 | Simmonds | 429/90 |

FOREIGN PATENT DOCUMENTS

| | | |
|---|---|---|
| 225106 | 6/1987 | European Pat. Off. . |
| WO91/08494 | 6/1991 | United Kingdom . |

*Primary Examiner*—Anthony Skapars
*Attorney, Agent, or Firm*—Parvel, Hewitt, Kimball & Krieger

[57] ABSTRACT

A removable battery pack for powering a pen-based or portable computer system in which the battery pack blocks its terminals when inserted into an unknown system. The known system includes a power supply microcontroller which passes battery charge data back and forth between a memory located in the battery pack and the power supply microcontroller. A battery microcontroller, located in the battery pack, eavesdrops drops on the communication between the power supply microcontroller and the memory, and when it validates a known signature of this communication, the battery microcontroller then enables the terminals of the battery pack. A trickle discharge current flows from the battery pack whenever the battery pack is out of the known system to allow the power supply microcontroller to power up in the case of a dead auxiliary battery.

37 Claims, 14 Drawing Sheets

| CGATE | DGATE | THERM | STATE OF BATTERY 100 |
|---|---|---|---|
| H | H | H | NORMAL OPERATION |
| H | H | L | OVERVOLTAGE |
| L | H | L | OVERCHARGE CURRENT |
| H | L | H | UNDERVOLTAGE/OVERDISCHARGE CURRENT |
*FIG. 6*
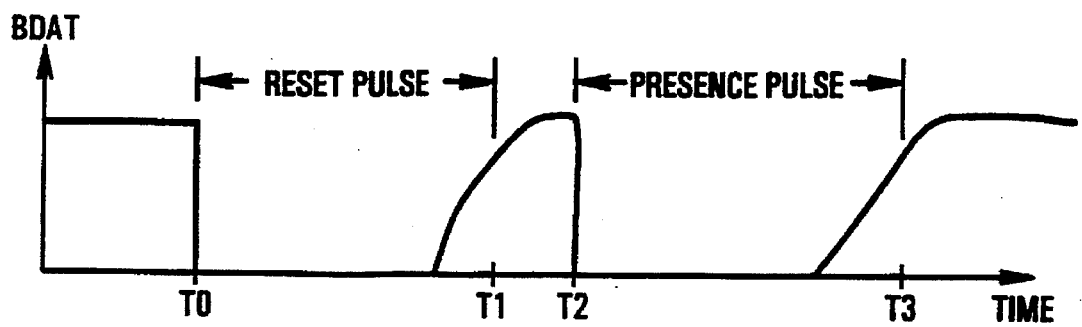
*FIG. 7A*
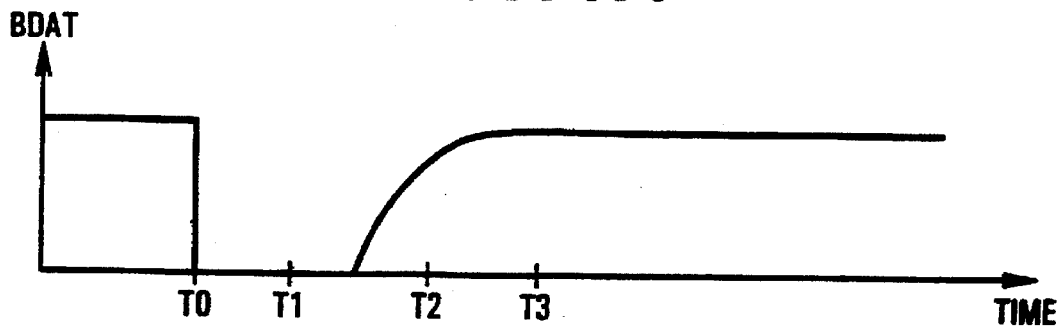
*FIG. 7B*
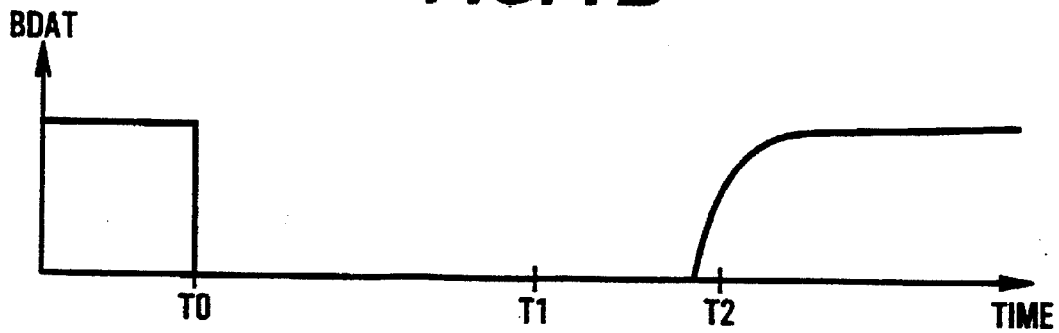
*FIG. 7C*

BATTERY PACK WITH A MONITORING CIRCUIT FOR A KNOWN SYSTEM

BACKGROUND OF THE INVENTION

1. Field of the Invention

The present invention relates to a removable battery pack for providing power to a known system, and more particularly to a removable battery pack which blocks charge from entering or leaving the battery pack until the battery pack is inserted into the known system.

2. Description of the Related Art

Computers are often needed in locations where AC power is not available. Rechargeable batteries are typically used as an alternative source of power, such as nickel-based batteries and lithium ion batteries, which are capable of providing power to a portable or pen-based computer system for several hours. For providing power to a computer system, these batteries are typically arranged in a battery pack containing four series banks of two parallel cells in each battery. Although the battery pack may be charged in an external charger, the battery pack of a computer system is typically charged by the power supply of the host computer system. Since rechargeable batteries have a limited cycle life, it is desirable to maximize the life of and to obtain the maximum power from each battery during every discharge cycle. Thus, in order to achieve these goals, it is necessary to fully and efficiently charge the battery pack in a system designed to accomplish these objectives.

The primary design challenge confronting the earlier nickel-based battery chargers arose from the difficulty in determining the charge level of a nickel-based battery since the terminal voltage of the nickel-based battery is substantially the same regardless of the charge level. This characteristic also holds true for lithium ion batteries. This problem was addressed by placing a microcontroller circuit and a memory inside a battery pack as disclosed in U.S. Pat. No. 5,315,228 entitled "Battery Charge Monitor and Fuel Gauge," which is hereby incorporated by reference. In that disclosure, the battery pack recalculates the remaining capacity of the battery pack over time; provides a fuel gauge to continually measure the remaining charge level at any given time; and measures the discharge of the battery pack during periods of non-use, often referred to as the self-discharge of the battery pack.

A further modification of this arrangement is disclosed in U.S. patent application Ser. No. 033,821 entitled "Battery Pack Including Static Memory and a Timer For Charge Management," filed Mar. 3, 1993, now U.S. Pat. No. 5,514,946, which is hereby incorporated by reference. A battery pack is disclosed in which the microcontroller is moved to the host computer system, thereby reducing the size and cost of the battery pack and increasing the battery pack shelf-life. The battery pack includes a small read only memory (ROM), a random access memory (RAM), and a real time clock. The operating parameters of the battery pack are contained in the ROM memory which includes a family code and battery type, the maximum charge temperature, low voltage set points, initial rated total capacity, and self-discharge rates for several time periods. The RAM includes such information as the remaining charge on the battery and the total capacity of the battery. Furthermore, the real time clock timestamps the RAM, thereby providing a measure of the elapsed time of removal of the battery pack from the host computer system. Thus, the host computer system has the appropriate information to provide optimal charge to the battery pack and to monitor the charge left in the battery pack.

One fundamental requirement of lithium ion batteries is that they be charged or discharged only when they are inserted in a known computer system or special charger designed to accommodate lithium ion batteries. This requirement is predominently due to potential for a lithium ion battery to possibly explode if improperly charged or discharged.

Thus, it is desirable to have a lithium ion battery pack which disables itself, by blocking charge entering or leaving the batteries, if the battery pack is not inserted into a known system. If the battery pack is inserted into an unknown system, (such as a short circuit), an unknown battery charger, or an unknown computer system, the battery pack will minimize the harm to the computer system, charger, or batteries of the battery pack. It is further desirable to have a battery pack which permanently disables itself should the terminal voltage of any battery cell of the battery pack drop below a deeply discharged voltage threshold which indicates a deeply discharged battery cell, thereby not allowing any recharging or discharging of the battery pack, as this would be dangerous as known to those skilled in the art.

SUMMARY OF THE PRESENT INVENTION

The present invention relates to a battery pack which enables itself only upon determining the battery pack is in a known system. The battery pack includes a battery; a battery microcontroller which eavesdrops on communications between a power supply microcontroller located in the known system and a battery pack memory located in the battery pack; a charge switch which can block any charge from entering the battery; and a main discharge switch which can block any charge from leaving the battery.

A monitoring circuit is coupled to the battery and to the battery microcontroller. The monitoring circuit monitors the battery for undervoltage, overvoltage, overcharge current, and overdischarge current conditions. The battery microcontroller is coupled to the control terminals of the charge switch and the main discharge switch, thereby controlling the charge entering or leaving the battery pack. The battery microcontroller ensures that neither the charge switch nor the main discharge switch is turned on until the battery microcontroller has determined that the battery pack has been inserted into the known system. This determination is made by examining the communications between the battery pack memory and the power supply microcontroller. If the battery microcontroller validates the signature of this communication, which confirms the battery pack is in the known system, then the battery microcontroller can enable the battery pack by turning on the charge switch and the main discharge switch.

In one embodiment, the battery pack includes four series banks of two parallel cells in each battery. The battery microcontroller, through a monitoring circuit, monitors the terminal voltage of each battery cell. When the terminal voltage of a battery cell drops below a minimum threshold voltage, 2.5–2.7 volts depending on the battery chemistry, which indicates a discharged battery cell, the battery microcontroller disables the battery pack by turning off the main discharge switch. If the battery microcontroller determines that it is in a known system, the battery microcontroller closes the charge switch to allow the battery pack to charge. If the terminal voltage of any battery cell drops below a deeply discharged threshold voltage, this indicates a deeply discharged battery. Although the actual value of this deeply discharged threshold voltage is debated, it is believed this deeply discharged threshold voltage is around 2.0 volts.

Nevertheless, the deeply discharged threshold voltage is typically specified by the manufacturer. Any recharging at this point is potentially dangerous; therefore, the battery pack should be discarded. Thus, the battery microcontroller permanently turns off the charge switch and the main discharge switch should the battery become deeply discharged.

The disclosed battery pack according to the invention further includes a trickle discharge switch coupled in parallel with the main discharge switch. A current limiting device is coupled in series with the trickle discharge switch to limit the current through the trickle discharge switch. This trickle discharge switch is closed when the battery pack is not in the known system, thereby allowing a trickle discharge current to discharge from the battery pack when the battery pack is connected to a load. While the trickle discharge current is small enough to minimize harm to the batteries should the battery pack be inserted into an unknown system, this trickle current discharge threshold is also sufficient to power up the power supply microcontroller of the known system. This would be necessary when an auxiliary battery supplying power to the power supply microcontroller is discharged or missing and no AC power is present, thereby preventing the power supply microcontroller from establishing communication with the battery pack memory. Without this trickle discharge current to "wake-up" the power supply microcontroller, the power supply microcontroller would never establish communication with the memory of the battery pack, and the battery microcontroller could not determine whether the battery pack has been inserted into a known system. The battery microcontroller turns off the trickle discharge switch if the terminal voltage of any battery cell indicates a discharged battery cell. The battery microcontroller will turn on the trickle discharge switch after the discharged cell is recharged unless the terminal voltage of the battery cell indicates a deeply discharged battery cell, i.e., a terminal cell voltage of less than the deeply discharged threshold voltage.

The battery pack also turns off the charge switch should an overvoltage or an overcharge current exist at the battery, and the battery pack turns off the main discharge switch should an undervoltage or an overdischarge current exist at the battery.

BRIEF DESCRIPTION OF THE DRAWINGS

A better understanding of the present invention can be obtained when the following detailed description of the preferred embodiment is considered in conjunction with the following drawings, in which:

FIG. 6 is a state table illustrating operation of the monitoring circuit according to the invention;

FIG. 7A is a timing diagram illustrating the initialization protocol utilized between the battery pack memory and the power supply microcontroller according to the invention;

FIG. 7B is a timing diagram illustrating the protocol for a battery data signal write or read of "1" according to the invention;

FIG. 7C is a timing diagram illustrating the protocol for a battery data signal write or read of "0" according to the invention;

DETAILED DESCRIPTION OF THE DRAWINGS

Figure 1:
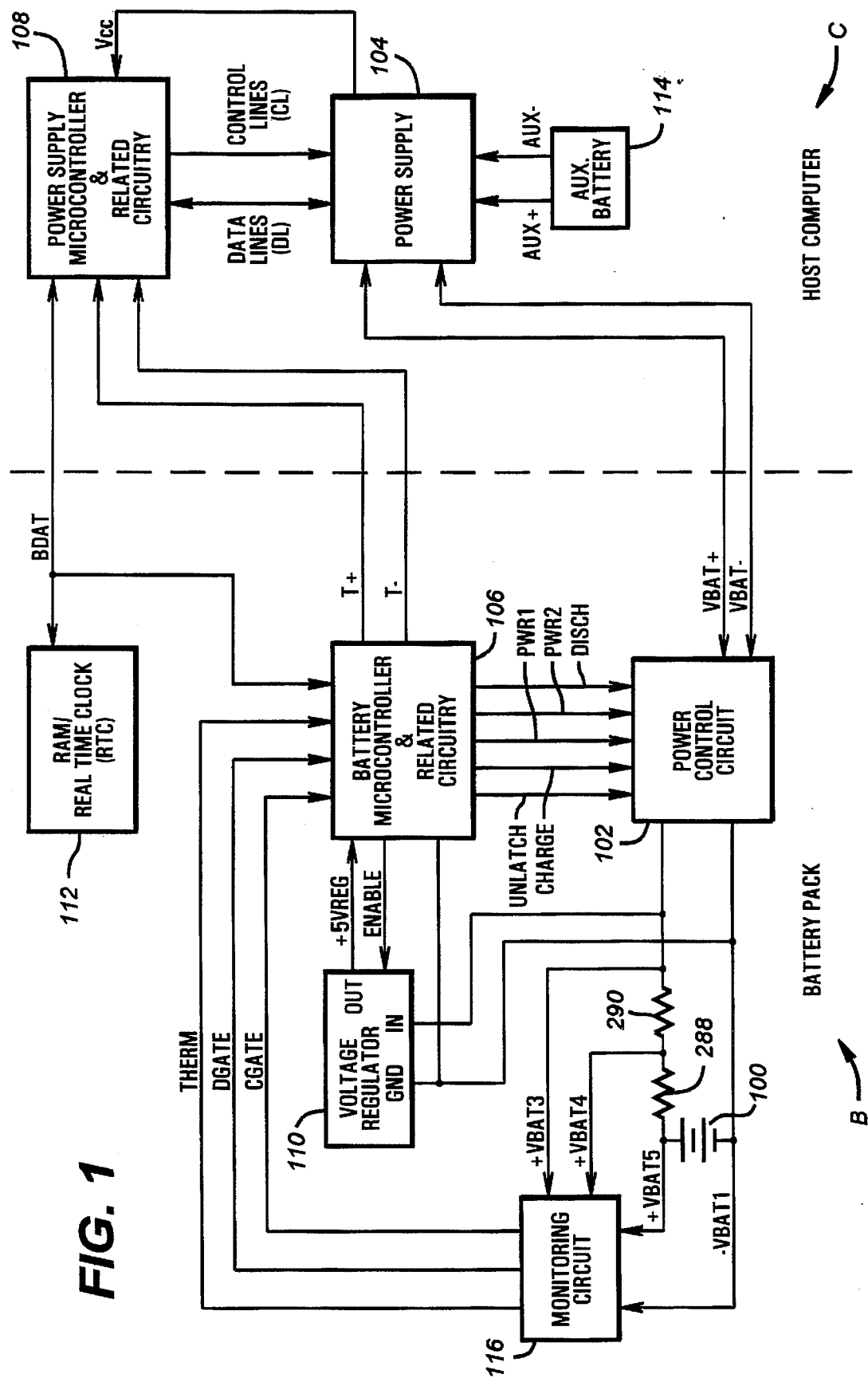
FIG. 1 is a block diagram illustrating the battery pack according to the invention inserted into a known host computer system.

Turning to the drawings, FIG. 1 is a block diagram of a battery pack B inserted into a known host computer system C. System C could alternatively be a special charging unit designed to charge the battery pack; however, in the disclosed embodiment, host computer system C both supplies and receives power from battery pack B.

Referring now to host computer system C, shown in FIG. 1 is a power supply or AC adapter 104 which is connected to an auxiliary battery 114. Power supply 104 is connected to a VBAT+ terminal of battery pack B and a VBAT– terminal of battery pack B. The VBAT+ and VBAT– terminals are the positive and negative terminals, respectively, of battery pack B that provide and receive power to and from host computer system C. Power supply 104 further provides a supply voltage, $V_{CC}$, which is connected to a power supply microcontroller and related circuitry 108. Power supply 104 is further coupled to power supply microcontroller 108 through several control lines, referred to as CL, and data lines, referred to as DL. Power supply microcontroller 108 provides and receives a BDAT signal, receives a T+ signal, and receives a T– signal from the battery pack B.

The BDAT signal is a battery data signal used to provide information such as the family code of battery pack B and the remaining charge left on a battery 100. T+ and T– are thermistor signals used to indicate charge conditions to power supply microcontroller 108.

Referring now to battery pack B of FIG. 1, a power control circuit 102 is connected to the VBAT+ and VBAT– terminals. Power control circuitry 102 is also coupled to battery 100. The positive terminal of battery 100 will be referred to as the +VBAT5 terminal, and the negative terminal of battery 100 will be referred to as the –VBAT1 terminal. A CHARGE signal, a PWR1 signal, a PWR2 signal, an UNLATCH signal and a DISCH signal, provided by a battery microcontroller and related circuitry 106, are also connected to power control circuit 102. Battery microcontroller 106 is also connected to a voltage regulator 110 which supplies a +5VREG supply voltage of five volts. Battery microcontroller 106 provides an ENABLE signal which is provided to a voltage regulator 110. Voltage regulator 110 has an input connected to the VBAT+ terminal, and the ground of regulator 110 is connected to the VBAT1– terminal. Battery microcontroller 106 is further connected to the BDAT signal, the T+ signal and the T- signal. Battery pack B further includes a memory, referred to as random access memory/realtime clock (RAM/RTC) 112, which is connected to the BDAT signal.

Also shown in FIG. 1 is a monitoring circuit 116 which provides battery cell overvoltage monitoring, cell undervoltage monitoring, overdischarge current monitoring, and overcharge current monitoring. Monitoring circuit 116 provides a THERM signal, a DGATE signal, and a CGATE signal to battery microcontroller 106. These signals are provided to battery microcontroller 106 which enables or disables the VBAT+ and VBAT– terminals accordingly, as explained further with the discussion of FIG. 6. Monitoring circuit 116 is coupled to the +VBAT5 signal and the –VBAT1 signal. This allows monitoring circuitry 116 to monitor battery 100 for overvoltage and undervoltage conditions, as discussed further below. Also shown in FIG. 1 are the +VBAT3 and +VBAT4 inputs of monitoring circuit 116. The +VBAT4 input is coupled between one end of a resistor 288 and one end of a resistor 290. The other end of resistor 288 is coupled to the +VBAT5 signal, and the other end of resistor 290 is coupled to the power control circuitry 102, the +VBAT3 signal and the unregulated voltage input of regulator 110. The +VBAT3 signal and +VBAT4 signals and the bridge formed from resistors 288 and 290 provide current monitoring capability for monitoring circuit 116.

Power supply 104 supplies and receives power from and to battery pack B. Power supply microcontroller 108 governs whether power supply 104 is receiving power from or providing power to battery pack B. Power supply microcontroller 108 directs the operations of power supply 104 through control lines CL. Power supply 104 provides a supply voltage, $V_{CC}$, to power supply microcontroller 108. The supply voltage, $V_{CC}$, is normally provided from either the discharging battery pack B, or if AC power is available through an adapter (not shown in FIG. 1), then the supply voltage, $V_{CC}$, is provided by the AC wall voltage. However, if the AC adapter is not connected to host computer system C and battery pack B is not supplying power to host computer C, auxiliary battery 114 supplies the necessary power to power up power supply microcontroller 108.

Power supply microcontroller 108 communicates with RAM/RTC 112 to obtain and update charge status of battery 100 so that power supply 104 can fully and efficiently charge battery 100. In the preferred embodiment, battery 100 consists of four series banks of two parallel lithium ion cells. Furthermore, power supply microcontroller 108 utilizes the temperature sensing signals, T+ and T-, in order to determine the charge status of battery 100. In the preferred embodiment, the temperature signals, T+ and T-, are manipulated by power control circuit 102 to indicate charge and over temperature conditions of battery 100 to power supply microcontroller 108.

Power control circuit 102 provides circuitry to inhibit or permit charge from entering or leaving battery 100. The CHARGE signal, the PWR1 signal, and the DISCH signal control the charging of battery 100, the trickle discharging of battery 100, and the main discharging of battery 100, respectively. The assertion of one of these three control signals enables its function.

During normal operations when battery pack B is inserted into the known system, host computer system C, the CHARGE signal and the DISCH signal are both asserted, thereby allowing battery 100 to charge and discharge as determined by power supply microcontroller 108. Should an overvoltage condition or an overcharge current exist at battery 100, power control circuit 102 will prevent any charge from entering battery pack B by negating the CHARGE signal. In the case of an undervoltage or an overdischarge current condition existing at battery 100, the power control circuitry 102 will prevent any charge from leaving battery pack B by negating the DISCH and PWR1 signals. Additionally, should a battery cell of battery 100 become deeply discharged, power control circuit 102 will permanently block any charge from leaving or entering battery pack B by permanently negating the DISCH and PWR1 signals. Furthermore, in the preferred embodiment, should an overtemperature condition exist at battery 100, power control circuit 102 will prevent any charge from entering battery pack B.

After battery pack B is removed from host computer system C, battery microcontroller 106 negates the CHARGE signal and the DISCH signal, thereby preventing any discharging or charging of battery 100. In the preferred embodiment, the PWR1 signal is asserted when battery pack B is removed from host computer system C, thereby allowing a trickle discharge current to flow from battery 100. As discussed in more detail below, this trickle discharge current allows power supply microcontroller 108 to power-up in the event that auxiliary battery 114 is dead. Furthermore, in the preferred embodiment, the PWR1 signal is permanently negated, even when battery pack B is not in host computer system C, if monitoring circuit 116 determines that a battery cell of battery pack 100 has dropped below a deeply discharged threshold voltage. This deeply discharged threshold voltage is specified by the manufacturer and is equal to 2.0 volts in the described embodiment.

If monitoring circuit 116 determines that a battery cell voltage of battery 100 has dropped below this deeply discharged threshold voltage, battery microcontroller 106 negates the CHARGE and DISCH signals. Should a cell voltage of battery 100 fall below this deeply discharged threshold and battery pack B is removed from host computer system C, battery microcontroller 106 negates the ENABLE signal, disabling voltage regulator 110, thereby permanently powering-down microcontroller 106. When microcontroller 106 powers down, no charge can enter or leave battery pack B. This ensures that battery pack B can never be used again because once a battery cell of battery 100 drops below this deeply discharged threshold voltage, the battery cell is deeply discharged and battery pack B must be discarded.

Battery microcontroller 106 is coupled to the BDAT signal, thereby allowing battery microcontroller 106 to examine the communications between RAM/RTC 112 and power supply microcontroller 108. If battery microcontroller 106 determines that it is in host computer system C, battery microcontroller 106 will recognize a characteristic signature of the data being passed between power supply microcontroller 108 and RAM/RTC 112, further discussed below in conjunction with FIGS. 7A–12. Once microcontroller 106 determines that battery pack B has been placed in host computer system C, battery microcontroller 106 then will allow the charge and discharge of battery 100 dependent on the state of battery 100.

Figure 2:
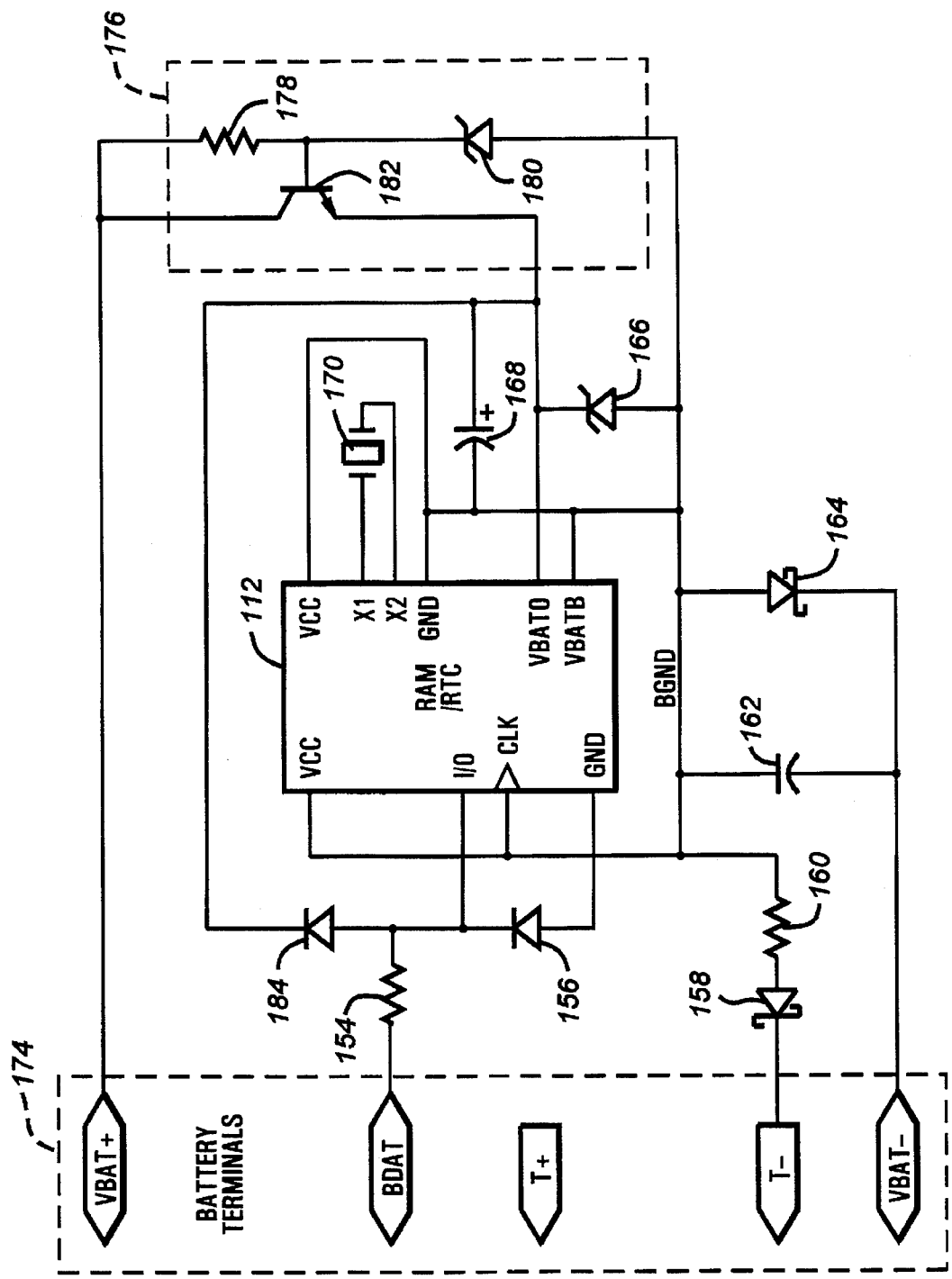
FIG. 2 is a schematic illustration of the charge management circuitry of FIG. 1.

Also shown in FIG. 2 is the RAM/RTC 112, which in the disclosed embodiment is preferably a DS1608 EconoRam TimeChip, which is manufactured by Dallas Semiconductor. The supply (VCC) pin, clock (CLK) pin, ground (GND) pin, and the battery backup (VBATB) pin of RAM/RTC 112 are connected to a BGND signal. The input/output (I/O) pin is connected to the cathode of a diode 156, one end of a resistor 154 and the anode of a diode 184. The cathode of diode 184 is connected to the battery operate (VBATO) pin of RAM/RTC 112. The anode of diode 156 is connected to the GND pin. The other end of resistor 154 is connected to the BDAT battery terminal. One side of a crystal oscillator 170 is connected to the X1 pin, and the other side of crystal oscillator 170 is connected to the X2 pin of RAM/RTC 112, thus providing the RAM/RTC 112 with a clock structure and function voltage limiting to VBATO. One side of a capacitor 168 is connected to the BGND signal, and the other side of capacitor 168 is connected to the VBATO pin. The cathode of a Zener diode 166 is connected to the VBATO input pin, and the anode of Zener diode 166 is connected to the BGND signal, thus providing voltage limiting to VBATO.

Also shown in FIG. 2 is an emitter follower regulator circuit 176. Regulator circuit 176 consists of a resistor 178 having one end connected to the VBAT+ terminal and the other end connected to the base of a NPN transistor 182 and the cathode of a Zener diode 180. Transistor 182 has its collector connected to the VBAT+ terminal and its emitter connected to the VBATO input pin of RAM/RTC 112. The anode of diode 180 is connected to the BGND signal.

Still referring to FIG. 2, a Zener diode 164 has its anode connected to the BGND signal and its cathode is connected to the VBAT– terminal of battery pack B. Further, BGND and VBAT– are also coupled by a filtering capacitor 162. A capacitor 162 has one end connected to the BGND signal, and the other end of capacitor 162 is connected to the VBAT– terminal of battery pack B. A current limiting resistor 160 provides the BGND signal to the anode of a Zener diode 158, whose cathode provides an output to the T– terminal of battery pack B.

The T+ and T– battery terminals provide temperature monitoring for power supply microcontroller 108; however, because the temperature of a lithium ion battery does not vary greatly with the charge state of the lithium ion battery, the T+ and T– signals are instead artificially manipulated by battery pack B in order to indicate the charging states of battery 100. The DS1608 is preferably used as RAM/RTC 112 since it includes an internal static RAM and a ROM for storing the operating parameters and charge status information of battery 100, a real time clock for measuring periods of non-use of the battery 100 and a one-wire serial communication capability for communicating with microcontroller 108.

Figure 3:
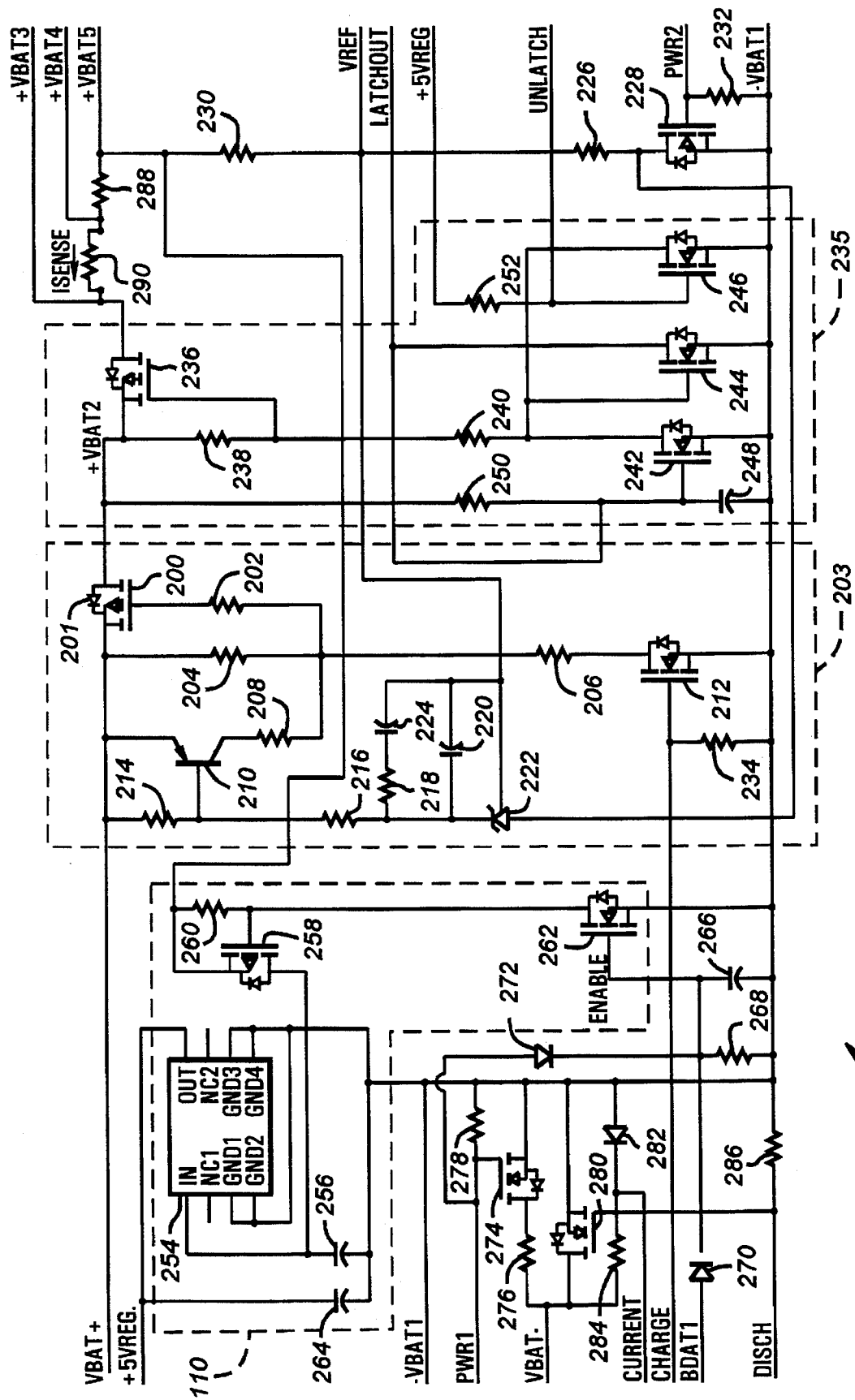
FIG. 3 is a schematic illustration of the power control circuitry of FIG. 1.

FIG. 3 is a schematic diagram of power control circuit 102. Shown in FIG. 3 is a voltage regulator 203 which regulates voltage using a P-channel metal-oxide-semiconductor field-effect-transistor (MOSFET), pass transistor 200. In this embodiment, pass transistor 200 serves a dual purpose, it not only acts as a regulator, it also serves as a charge inhibit transistor. A voltage regulator 203 provides the correct voltage level to charge battery 100. Referring to the connections of regulator 203, transistor 200 has its drain connected to a +VBAT2 signal, its gate connected to one end of a resistor 202 and its source connected to the VBAT+ terminal. An inherent diode 201 has its cathode connected to the VBAT+ terminal, and the anode of diode 201 is connected to the +VBAT2 signal. The other end of resistor 202 is connected to one end of a resistor 204, one end of a resistor 206, and one end of a resistor 208. The other end of resistor 204 is connected to the VBAT+ terminal. The other end of resistor 208 is connected to the collector of a PNP bipolar 210. The other end of resistor 206 is connected to the drain of an enhancement type, N-channel MOSFET, transistor 212. The source of transistor 212 is connected to the –VBAT1 signal, and the gate of transistor 212 is connected to the CHARGE signal. The emitter of transistor 210 is connected to the VBAT+ terminal, and the base of transistor 210 is connected to one end of a resistor 214 and one end of a resistor 216. The other end of resistor 214 is connected to the VBAT+ terminal. The other end of resistor 216 is connected to one end of a resistor 218, one end of a capacitor 220 and the cathode of a shunt regulator 222. The other end of resistor 218 is connected to one end of a capacitor 224, and the other end of capacitor 224 is connected to a VREF signal. The other end of capacitor 220 is connected to the VREF signal. The control terminal of shunt regulator 222 is connected to the VREF signal, and the anode of shunt regulator 222 is connected to one end of a resistor 226 and the drain of an enhancement type, N-channel MOSFET, transistor 228. The gate of transistor 228 is connected to a PWR2 signal, and the source of transistor 228 is connected to the –VBAT1 signal. The other end of resistor 226 is connected to the VREF signal. One end of a resistor 230 is connected to the VREF signal, and the other end of resistor 230 is connected to a +VBAT5 signal. A resistor 232 is connected between the PWR2 signal and the –VBAT1 signal. A resistor 234 is connected between the CHARGE signal and the –VBAT1 signal.

Also shown in FIG. 3 is an overvoltage protection circuit 235 which prevents any charge from entering battery 100 if an overvoltage condition exists at the terminals of battery 100, +VBAT5 and –VBAT1. The drain of a P-channel MOSFET, transistor 236, is connected to a +VBAT3 signal. The gate of transistor 236 is connected one end of a resistor 238 and one end of a resistor 240. The other end of resistor 238 is connected to the +VBAT2 signal. The other end of resistor 240 is connected to the drain of an enhancement type, N-channel MOSFET, transistor 242, the gate of an enhancement type, N-channel MOSFET, transistor 244, and the drain of an enhancement type, N-channel MOSFET, transistor 246. The gate of transistor 242 is connected to a LATCHOUT signal, and the source of transistor 242 is connected to the –VBAT1 signal. The negation of the normally high LATCHOUT signal turns off transistor 236 when the terminal voltage of battery 100 exceeds a predetermined maximum voltage. This prevents battery 100 from overcharging. A capacitor 248 is connected between the LATCHOUT signal and the –VBAT1 signal. A resistor 250 is connected between the +VBAT2 signal and the LATCHOUT signal. Transistor 244 has its drain connected to the LATCHOUT signal, and the source of transistor 244 is connected to the –VBAT1 signal. Transistor 246 has its gate connected to an UNLATCH signal, and the source of transistor 246 is connected to the –VBAT1 signal. The UNLATCH signal is provided to turn on transistor 236 after the LATCHOUT signal has been negated and no overvoltage conditions exists at battery 100. A resistor 252 is connected between the UNLATCH signal and a +5VREG signal.

Also shown in FIG. 3 is a voltage regulator 254. The output pin of regulator 254 provides the +5VREG signal. Both the input and the output ground pins of regulator 254 are connected to the −VBAT1 signal. The input pin of regulator 254 is connected to one end of a capacitor 256 and to the drain of a P-channel MOSFET, transistor 258. The source of transistor 258 is connected to the VREF signal, and the gate of transistor 258 is connected to one end of a resistor 260 and the drain of an enhancement type, N-channel MOSFET transistor 262. The other end of resistor 260 is connected to the VREF signal. A capacitor 264 is connected between the +5VREG signal and the −VBAT1 signal. The gate of transistor 262 is connected to an ENABLE signal. The ENABLE signal is also connected to one end of a capacitor 266, one end of a resistor 268, the cathode of a diode 270 and the cathode of a diode 272. The source of transistor 262 is connected to the −VBAT1 signal. The other end of capacitor 266 is connected to the −VBAT1 signal. The other end of resistor 268 is connected to the −VBAT1 signal. The anode of diode 270 is connected to a BDAT1 signal. The anode of diode 272 is connected to a PWR1 signal.

Also shown in FIG. 3 is the circuitry to block or allow the discharge of battery 100. The source of an enhancement type, N-channel MOSFET, main discharge transistor 274, is connected to the −VBAT1 signal, the gate of transistor 274 is connected to the PWR1 signal and the drain of transistor 274 is connected to one end of a resistor 276. A resistor 278 is connected between the PWR1 signal and the −VBAT1 signal. The other end of resistor 276 is connected to the VBAT− terminal. The source of an enhancement type, N-channel MOSFET, trickle charge transistor 280 is connected to the −VBAT1 signal, the gate of transistor 280 is connected to a DISCH signal and the drain of transistor 280 is connected to the VBAT− terminal. The cathode of a diode 282 is connected to the −VBAT1 signal, and the anode of diode 282 is connected to a CURRENT signal. The CURRENT signal is asserted when battery 100 is charging and negated otherwise. One end of a resistor 284 is connected to the CURRENT signal, and the other end of resistor 284 is connected to the VBAT− terminal. One end of a resistor 286 is connected to the −VBAT1 signal, and the end of resistor 286 is connected to the DISCH signal.

Also shown in FIG. 3 is the current-sensing circuitry of battery pack B which was discussed with FIG. 1. Resistors 288 and 290 are connected between the +VBAT5 line and the +VBAT3 line, with +VBAT4 being provided at the junction. Thus, the voltage across resistor 290 provides current sensing by signals VBAT3 and VBAT4 signals. Resistor 290 is connected between the +VBAT4 signal and the +VBAT3 signal. Resistors 288 and 290 are precision resistors having small resistances.

Now describing operations of power control circuit 102, transistor 200, coupled between the positive terminals of power supply 104 and the battery 100, VBAT+ and +VBAT5 respectively, allows power supply 104 (FIG. 1) to charge battery 100. Diode 201 provides a discharge path for battery 100, thereby allowing discharge of battery 100 when either main discharge transistor 280 or trickle discharge transistor 274 is turned on. Transistor 200 serves two functions: transistor 200 enables or disables the charging of battery 100 and transistor 200 also serves as a pass transistor for regulator 203. In the preferred embodiment, transistor 200 has a low $RDS_{ON}$ resistance of 0.02 ohms and a high gate-source breakdown voltage of +/−20 volts DC. Transistor 212 enables or disables transistor 200, thereby disabling or enabling regulator 203. The gate of transistor 212 is connected to the CHARGE signal which controls the on/off switching of transistor 212.

The CHARGE signal is provided by battery microcontroller 300 (shown in FIG. 4); therefore, by asserting or negating the CHARGE signal, battery microcontroller 300 can control the on/off switching of transistor 200, thereby controlling the charge that enters battery 100. Diode 282 provides a path for a charge current when transistor 200 is turned on. Transistor 228 ensures that should battery pack B be disconnected from the host computer system C, linear regulator 203 will not drain current from the rest of the circuit. The PWR2 signal is asserted by battery controller 300 when battery pack B is not in host computer system C, thereby eliminating the loading by linear regulator 203.

Also shown in FIG. 3 is main discharge transistor 280 which controls any charge leaving battery 100. The gate of transistor 280 is connected to the DISCH signal, provided by battery microcontroller 300, which controls the on/off switching of transistor 280. Diode 201 provides a discharge path when transistor 280 is turned on. Also shown in FIG. 3 is diode 282 and resistor 284 which provide a charge path when transistor 200 is switched on. Resistor 284 functions as a current sensing resistor which provides a CURRENT signal to indicate charging of battery 100 as discussed further below. Also shown in FIG. 3 is trickle discharge transistor 274 activated by control signal PWR1. Resistor 276 allows a maximum trickle discharge current which is sufficient to allow power supply microcontroller 108 to "wake-up" in the case of a dead auxiliary battery 114 and establish communications with RAM/RTC 112.

Also shown in FIG. 3 is regulator circuit 110. Linear regulator 254 provides the supply voltage to power battery microcontroller 300, +5VREG. Regulator 254 provides the output voltage, +5VREG, from the positive terminal of battery 100, +VBAT5. Transistor 258 serves as a pass transistor which is enabled or disabled by transistor 262. Transistor 262 can be turned on by either the PWR1 signal or the BDAT1 signal. As discussed further in FIG. 3, the PWR1 signal is asserted, thereby turning on transistor 262 and enabling regulator 254, when battery pack B is out of the host computer system C. Because the BDAT1 signal is normally high when battery pack B is inserted into the host computer system C (as discussed further in conjunction FIG. 4), the BDAT1 signal keeps transistor 262 turned on once battery pack B is in the host computer system C. Diode 270, diode 272, resistor 268 and capacitor 266 form a peak detector circuit with two inputs, PWR1 and BDAT1. Note that there is little current drain from capacitor 266; therefore, a normally high data signal, such as BDAT1 (as discussed further in conjunction with FIG. 4), will be able to sustain operation of linear regulator 254.

FIG. 3 also illustrates a latch circuit 235 which prevents any charge from entering the battery 100 if an overvoltage condition exists at battery 100. In the disclosed embodiment, latch circuit 235 ensures that the voltage of battery 100 does not exceed 18 volts DC. This is accomplished by the LATCHOUT signal connected to the gate of transistor 242. When the LATCHOUT signal is low, this indicates the terminal voltage of battery 100 has exceeded the maximum battery terminal voltage, preferably 18 volts DC. When this occurs, transistor 242 is turned off by the LATCHOUT signal, thereby turning off transistor 236 and preventing any charge from entering battery pack B. Note that transistor 244 is also turned and transistor 244 form a latch, thereby preventing transistor 242 from turning back on; therefore, transistor 236 remains turned off. The latching circuit 235 can be reset by a pulsed assertion of the UNLATCH signal which turns on transistor 242 and transistor 236. The generation of the LATCHOUT signal will be described in greater detail with the discussion of FIG. 5, and the generation of the UNLATCH signal will be discussed in greater detail with the discussion of FIG. 4.

Figure 4:
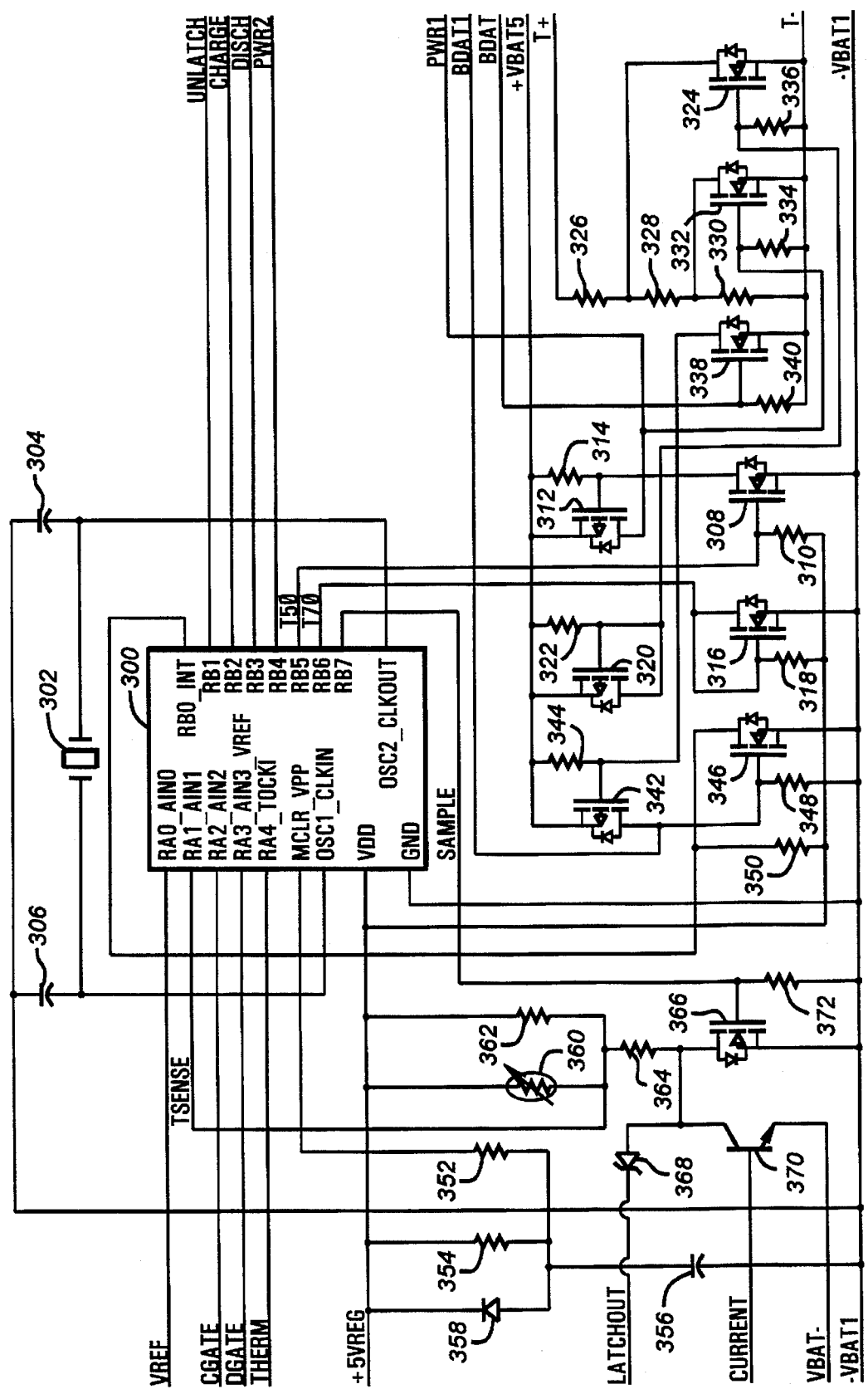
FIG. 4 is a schematic illustration of the power battery microcontroller circuitry of FIG. 1.

FIG. 4 is a schematic diagram of battery microcontroller 106. Shown in FIG. 4 is a battery microcontroller 300. The supply voltage pin for the controller 300 is connected to the +5VREG signal and the ground pin of controller 300 is connected to the −VBAT1 signal. The RA0_AIN0, RA1_AIN1, RA2_AIN2, RA3_AIN3 and RA4_TOCKI pins of microcontroller 300 are analog inputs to a multiplexed A/D converter residing in microcontroller 300. The VREF signal is provided to the RA0_AIN0 pin, the CGATE signal is connected to the RA1_AIN1 pin, the DGATE signal is connected to the RA3_AIN3 VREF pin, and the THERM signal is connected to the RA4_TOCKI pin. The RB1 pin is connected to the UNLATCH signal, the RB2 pin is connected to the CHARGE signal, the RB3 pin is connected to the DISCH signal and the RB4 pin is connected to the PWR2 signal. The OSC2_CLKOUT pin is connected to one end of an oscillator circuit 302 and one end of a capacitor 304. The OSC1_CLKIN pin is connected to the other end of oscillator 302 and one end of a capacitor 306. The other end of capacitor 306 is connected to the −VBAT1 signal. The other end of capacitor 304 is connected to the −VBAT1 signal.

The RB5 output pin of microcontroller 300 provides the T50 signal which is used to indicate the completion of charging of battery 100 to power supply microcontroller 108 when power control circuit 102 blocks charge from entering battery pack B. The RB5 output pin is connected to the gate of an enhancement type, N-channel MOSFET, transistor 308, and one end of a resistor 310. The other end of resistor 310 is connected to the +5VREG signal. The source of transistor 308 is connected to the −VBAT1 signal, and the drain of transistor 308 is connected to the gate of a P-channel MOSFET, transistor 312, and one end of a resistor 314. The other end of resistor 314 is connected to the +5VREG signal. The source of transistor 312 is connected to the +VBAT5 signal, and the drain of transistor 312 is connected to the PWR1 signal.

The RB6 output pin of microcontroller 300 provides a T70 signal to manipulate the temperature sensing signals, T+ and T−, in order to indicate an overtemperature condition of battery 100 to power supply microcontroller 108. The T70 signal is connected to the gate of a N-channel, enhancement type, MOSFET, transistor 316 and one end of a resistor 318. The other end of resistor 318 is connected to the +5VREG signal. The drain of transistor 316 is connected to the gate of a P-channel MOSFET, transistor 320, and one end of a resistor 322; and the source of transistor 316 is connected to the −VBAT1 signal. The other end of resistor 322 is connected to the +VBAT5 signal. The source of transistor 320 is connected to the +VBAT5 signal, and the drain of transistor 320 is connected to the gate of an enhancement type, N-channel MOSFET, transistor 324.

Also shown in FIG. 4 is the switched resistor network which manipulates the T+ and T− signals. Transistor 324 has its source connected to the T− terminal, and the drain of transistor 324 is connected to one end of a resistor 326 and one end of a resistor 328. The other end of resistor 326 is connected to the T+ terminal. The other end of resistor 328 is connected to one end of a resistor 330 and the drain of an enhancement type, N-channel MOSFET, transistor 332. The other end of resistor 330 is connected to the T− terminal. A resistor 334 is connected between the PWR1 signal and the T− terminal. A resistor 336 has one end connected to the gate of resistor 324, and the other end of resistor 336 is connected to the T− terminal.

The BDAT signal allows microcontroller 300 to determine if battery pack B is in host computer system C. The BDAT signal is connected to the gate of an enhancement type, N-channel MOSFET, transistor 338, and one end of a resistor 340. The other end of resistor 340 is connected to the T− terminal. The source of transistor 338 is connected to the T− terminal, and the drain of transistor 338 is connected to the gate of a P-channel MOSFET, transistor 342, and one end of a resistor 344. The other end of resistor 344 is connected to the +VBAT5 signal. The source of transistor 342 is connected to the +VBAT5 signal, and the drain of transistor 342 is connected to a BDAT1 signal. An enhancement type, N-channel MOSFET, transistor 346, has its drain connected to the interrupt ins RB0_INT, of microcontroller 300, its gate connected to the BDAT1 signal and its source connected to the −VBAT1 signal. A resistor 348 is connected between the BDAT1 signal and the −VBAT1 signal. A resistor 350 is connected between the RB0_INT pin of microcontroller 300 and the +5VREG signal.

The MCLR_VPP and the OSC2_CLKOUT pins of microcontroller 300 set the clock frequency of microcontroller 300. The MCLR_VPP pin of microcontroller 300 is connected to one end of a resistor 352; and the other end of resistor 352 is connected to one end of a resistor 354, one end of a capacitor 356 and the anode of a diode 358. The other end of capacitor 356 is connected to the −VBAT1 signal. The other end of resistor 354 is connected to the +5VREG signal. The cathode of diode 358 is connected to the +5VREG signal. Diode 358, resistor 354 and resistor 352 provide the circuitry required to power-up microcontroller 300.

Still referring to FIG. 4, shown in FIG. 4 is the circuitry to monitor the temperature of battery 100. The RA1_AIN1 pin of microcontroller 300 is connected to one end of a thermistor 360, one end of a resistor 362 and one end of a resistor 364. The other end of thermistor 360 is connected to the +5VREG signal. The other end of resistor 362 is connected to the +5VREG signal. The other end of resistor 364 is connected to the drain of an enhancement type, N-channel MOSFET, transistor 366; the anode of a Schottky diode 368 and the collector of a NPN transistor 370. The cathode of diode 368 is connected to the LATCHOUT signal. The base of transistor 370 is connected to the CURRENT signal, and the emitter of transistor 370 is connected to the VBAT− terminal. The gate of transistor 366 is connected to the RB7 pin of controller 300, and the source of transistor 366 is connected to the −VBAT1 signal. Resistor 372 is connected between the RB7 pin of controller 300 and the −VBAT1 signal. The RB7 pin of controller 300 provides the SAMPLE signal.

Now referring to operations of battery microcontroller 106, the BDAT signal is provided to transistor 338; therefore, when power supply microcontroller 108 asserts BDAT high, the drain of transistor 338 is negated which turns on transistor 342, thereby asserting the BDAT1 signal. Referring back to FIG. 3 and FIG. 1, the BDAT1 signal keeps regulator 110 enabled when battery pack B is installed in host computer system C. The normally high BDAT1 signal keeps capacitor 266 charged and the ENABLE signal high which keeps the voltage regulator 254 enabled, thereby sustaining power-up of battery microcontroller 300. Once battery pack B is removed from host computer system C, the BDAT signal is no longer provided by power supply microcontroller 108; therefore, the BDAT1 signal is negated.

Thus, microcontroller 300 must assert another signal, PWR1, in order to keep regulator 254 enabled.

When removed from the host computer system C, the battery microcontroller 300 keeps regulator 254 enabled by asserting the PWR1 signal. Microcontroller 300 accomplishes this by asserting the T50 signal which turns on transistor 308 and transistor 312, thereby asserting the PWR1 signal and the ENABLE signal. The T50 signal is negated when microcontroller 300 determines it is in host computer system C. Note that once it is in the host computer system C, as discussed above, the BDAT signal will keep regulator 254 fully functional, thereby supplying power to microcontroller 300.

Because the temperature of a lithium ion battery varies little during charge, the thermistor signals, T+ and T−, must be manipulated by switched resistor circuits in order to emulate different temperature states of battery 100. For example, if transistor 332 is switched on by microcontroller 300 asserting T50, the T+ and T− signals then appear as if battery 100 is at 50° C., and if transistor 234 is switched on by microcontroller 300 asserting T70, the T+ and T− signals then appear as if battery 100 is at 70° C. Microcontroller 300 can pulse the T50 signal to simulate a rise in temperature of battery 100. When battery pack B is out of host computer system C, the PWR1 signal is asserted to enable regulator 254; therefore, because transistor 332 is also connected PWR1, transistor 332 is turned on which makes battery 100 appear to be 50° C. However, since battery pack B is out of host computer system C, the temperature signals, T+ and T−, are not needed. Once microcontroller 300 determines that battery pack B is in host computer system C, the PWR1 signal is no longer asserted, thereby terminating the 50° C. T+ and T− signals produced by transistor 332.

Still referring to FIG. 4, when battery pack B is first inserted into host computer system C and the BDAT signal is first asserted, transistor 346 provides a falling edge signal at the RB0_INT input pin of microcontroller 300 which generates an interrupt. When this occurs, microcontroller 300 transfers control to an algorithm (discussed below in conjunction with FIGS. 8A–8B) to check if battery pack B has been inserted in host computer system C. If battery microcontroller 300 determines that battery pack B has not been inserted in host computer system C, battery microcontroller 300 ensures that the CHARGE signal and the DISCH signal will remain negated, thereby blocking the VBAT+ and VBAT− terminals of battery pack B. As long as battery pack B is not in host computer system C, battery microcontroller 300 asserts the PWR1 signal which ensures that regulator 254 will remain powered-up, thereby ensuring microcontroller 300 will remain powered up.

Still referring to FIG. 4, the preferred embodiment also monitors the voltages of the battery cells comprising battery 100, which ensures that both the VBAT+ terminal and the VBAT− terminal of battery pack B will be blocked if the voltage of any cell of battery 100 drops below a discharged threshold voltage. This discharged threshold voltage has a value of 2.5–2.7 volts and varies with the manufacturer. The discharged threshold voltage has a value of 2.7 volts in the described embodiment. Once the voltage of any one cell of battery 100 drops below this discharged threshold voltage, microcontroller 300 ensures that the DISCH signal will be negated, thereby ensuring that battery 100 will not be further discharged. If a battery cell of battery 100 drops below this discharged threshold voltage, battery microcontroller 300 will assert the CHARGE signal to allow battery 100 to charge once the known signature is detected on the BDAT signal by microcontroller 300.

When the cell voltage of any one cell of battery 100 drops below a deeply discharged threshold voltage, 2.0 volts in the described embodiment, this indicates that battery 100 is deeply discharged and must be permanently disabled. Once this occurs, microcontroller 300 ensures that the CHARGE and DISCH signals are negated, thereby ensuring that the VBAT+ and VBAT− terminals of battery pack B will remain permanently blocked which ensures battery 100 will not be used again. Once this condition occurs, the PWR1 signal is no longer asserted if battery pack B is removed from host computer system C. This ensures that once a deeply discharged battery has been detected, voltage regulator 254 will become disabled, thereby permanently powering down the circuitry of battery pack B once battery pack B is removed from host computer system C.

Now referring both to FIGS. 3 and 4, the PWR1 signal is asserted whenever battery pack B is not in host computer system C. Thus, until battery microcontroller 300 determines that battery pack B is in host computer system C, the PWR1 signal will remain asserted. The assertion of the PWR1 signal turns on transistor 274, thereby allowing a trickle discharge current. This trickle discharge current, although not large enough to harm an invalid system, is enough current to power-up microcontroller 108 if auxiliary battery 114 is dead. The trickle discharge current is limited by resistor 284. Thus, this trickle discharge feature allows battery pack B to wake-up power supply microcontroller 108 if auxiliary battery 114 is dead. As noted previously, once battery pack B determines that battery pack B is out of host computer system C, the PWR1 signal is asserted, thereby turning on the trickle charge current by turning on transistor 274.

If one of the cells of battery pack 100 drops below a deeply discharged threshold voltage, even a slight discharge current would be dangerous because a battery cell of battery 100 is deeply discharged. Thus, when any cell of battery 100 drops below this deeply discharged threshold voltage, 2.0 volts in the described embodiment, the PWR1 signal is no longer asserted, thereby ensuring no trickle discharge current.

Thermistor 360, resistor 362, resistor 364, transistor 366 and transistor 370 are employed to monitor the temperature of battery 100. This circuitry will warn if battery 100 has been damaged while also monitoring the ambient temperature of battery 100 before allowing battery 100 to charge. Resistor 362 is used to linearize thermistor 360. The SAMPLE signal, provided by the RB7 pin of microcontroller 300, is provided to allow microcontroller 300 to enable this circuitry only when sampling the temperature of battery 100, thereby conserving power. Now referring both to FIGS. 3 and 4, when battery pack B is charging, the CURRENT signal is asserted which turns on transistor 370. Thus, this temperature monitoring circuitry is left on when battery pack B is charging in order to continuously monitor for an overtemperature condition.

Figure 5:
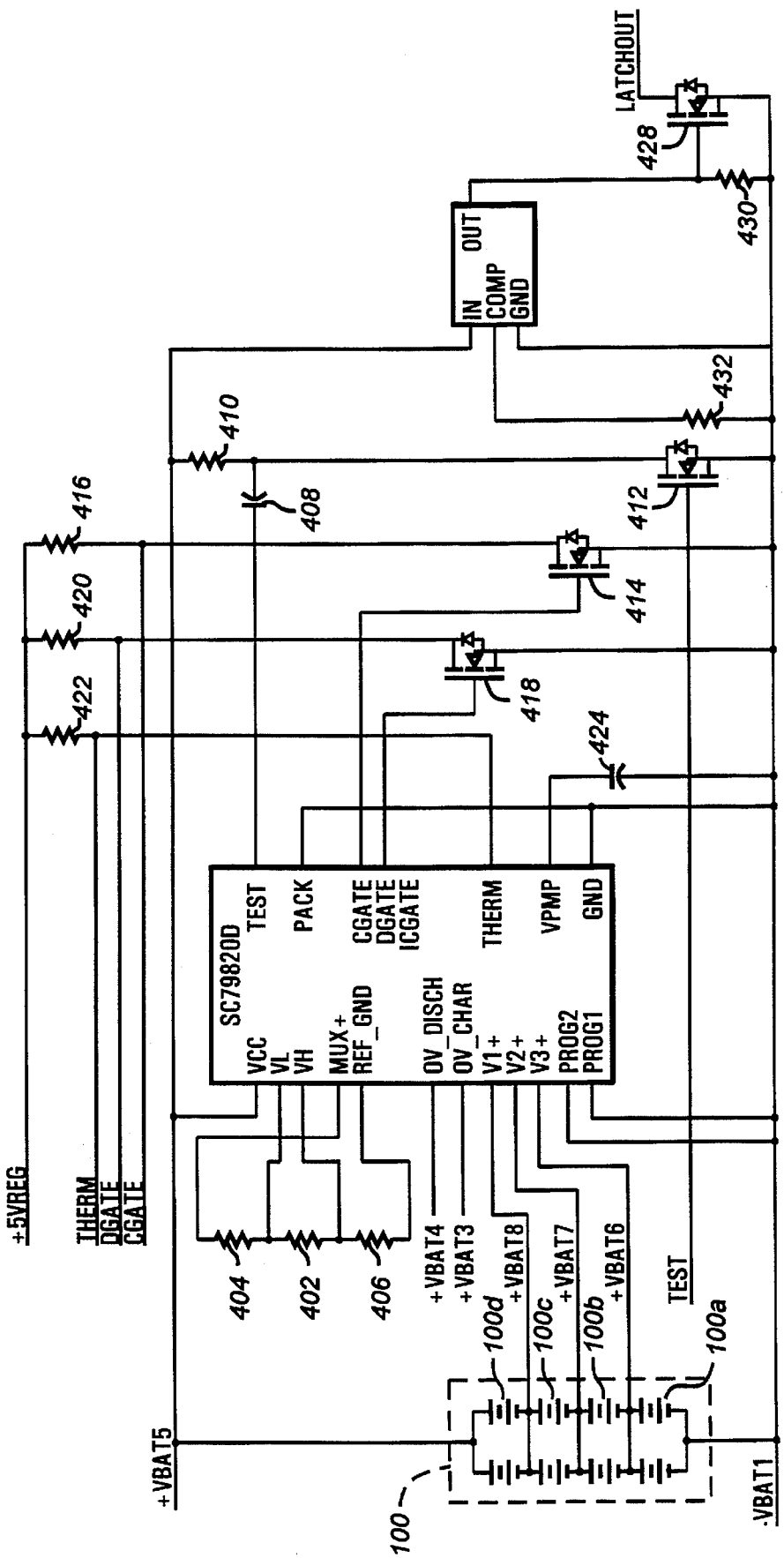
FIG. 5 is a schematic illustration of the monitoring circuitry of FIG. 1.

FIG. 5 is a schematic diagram of monitoring circuit 116 of battery pack B. Shown in FIG. 5 is a monitoring circuit 400. Monitoring circuit 400 is preferably a Lithium Charge Control Integrated Circuit (LCCIC) manufactured by Motorola. The supply voltage of circuit 400 is connected to the +VBAT5 signal, and the ground of circuit 400 is connected to the −VBAT1 signal. The voltage low (VL) pin of circuit 400 is connected to one end of a resistor 402 and one end of a resistor 404. The voltage high (VH) pin of circuit 400 is connected to one end of a resistor 406 and the other end of resistor 402. The MUX+ pin of circuit 400 is connected to the other end of resistor 404. The ground reference (REF_GND) pin of circuit 400 is connected to the other end of resistor 406.

The over discharge current (OV_DISCH) pin of circuit 400 is connected to the +VBAT4 signal. The overcharge current (OV_CHAR) pin is connected to the +VBAT3 signal. The V1+ pin of circuit 400 is connected to a +VBAT8 signal. The V2+ pin of circuit 400 is connected to a +VBAT7 signal. The V3+ pin of circuit 400 is connected to a +VBAT6 signal. Both the PROG2 pin and the PROG1 pin of circuit 400 are connected to the −VBAT1 signal. The TEST pin of circuit 400 is connected to one end of a capacitor 408. The other end of capacitor 408 is connected to a resistor 410 and the drain of a N-channel, enhancement type, MOSFET, transistor 412. The other end of resistor 410 is connected to the +VBAT5 signal.

The gate of transistor 412 is connected to a TEST signal, and the source of transistor 412 is connected to the −VBAT1 signal. The PACK pin of circuit 400 is connected to the −VBAT1 signal. The CGATE pin of circuit 400 is connected to the gate of an enhancement type, N-channel MOSFET, transistor 414. The drain of transistor 414 is connected to the CGATE signal, and the source of transistor 414 is connected to the −VBAT1 signal. A resistor 416 is connected between the CGATE signal and the +5VREG signal. The DGATE pin of circuit 400 is connected to the gate of an enhancement type, N-channel MOSFET, transistor 418. The drain of transistor 418 is connected to the DGATE signal, and the source of transistor 418 is connected to the −VBAT1 signal. A resistor 420 is connected between the DGATE signal and the +5VREG signal. The THERM pin of circuit 400 provides the THERM signal. A resistor 422 is connected between the THERM signal and the +5VREG signal. The VPMP pin of circuit 400 is connected to one end of a capacitor 424, and the other end of capacitor 424 is connected to the −VBAT1 signal.

Also shown in FIG. 3 is circuitry which prevents a cell of battery 100 from overcharging. Shown in FIG. 5 is a lithium ion battery charge controller 426. The input of charge controller 426 is connected to the +VBAT5 signal, and the output of charge controller 426 is connected to the gate of an enhancement type, N-channel MOSFET, transistor 428, and one end of a resistor 430. The ground input of charge controller 426 is connected to the −VBAT1 signal. The COMP pin of charge controller 426 is connected one end of a resistor 432. The other end of resistor 432 is connected to the −VBAT1 signal. The source of transistor 428 is connected to the −VBAT1 signal, and the drain of transistor 428 is connected to the LATCHOUT signal.

Charge controller 426 ensures that the voltage of battery 100 does not exceed a predetermined overvoltage threshold. In the described embodiment this is 18 volts DC. In the preferred embodiment, charge controller 426 is a LM3420 lithium ion battery charge controller manufactured by National Semiconductor. Charge controller 426 has an open emitter output connected to the gate of transistor 248 which turns on when the voltage at the input pin of charge controller 426 exceeds the predetermined overvoltage threshold. Resistor 432 is used to adjust the nominal voltage level of the charge controller 426, 16.8 volts, to the predetermined overvoltage threshold of 18 volts in the described embodiment. The drain of transistor 428 negates the LATCHOUT signal when the terminal voltage of battery 100 exceeds the overvoltage threshold.

If the LATCHOUT signal is negated during the charging of battery 100, the LATCHOUT signal will not be reasserted until the charging ceases. Referring now to FIGS. 3 and 4, during the charging of battery 100, the CURRENT signal is asserted by the charge current in resistor 284. The assertion of the CURRENT signal turns on transistor 370 and pulls the anode of diode 368 low which prevents the LATCHOUT signal from being reset to its normally high voltage. Once no charge current exists in resistor 284, transistor 370 is turned off; therefore, the LATCHOUT signal is reset to its normally high voltage.

Monitoring circuit 400 monitors current and voltage of battery pack B. As shown in FIG. 5, monitoring circuit 400 monitors cell banks 100a, 100b, 100c and 100d which form battery 100. Each cell bank includes two parallel lithium ion cells. Circuit 400 provides a CGATE signal, a DGATE signal and a THERM signal that provide information to microcontroller 300 on the status of battery 100. Now referring to FIGS. 5 and 6, the THERM signal, the DGATE signal and the CGATE signal are all high during normal operation of battery pack B. Monitoring circuit 400 monitors the voltage of banks 100a, 100b, 100c and 100d through the use of the +VBAT6 signal, the +VBAT7 signal, the +VBAT8 signal and the VBAT5 signal, respectively. When monitoring circuit 400 detects an unequal voltage among the cells of battery 100, monitoring circuit 400 engages a parallel MOSFET and resistor which discharges any overvoltage cell in order to equalize the voltage among the cells. Thus, monitoring circuit 400 ensures that the same voltage exists on all cells by monitoring cell banks 100a, 100b, 100c, and 100d. When an overvoltage condition occurs, monitoring circuit 400 negates the THERM signal, thereby indicating to microcontroller 300 that an overvoltage condition exists at battery 100. The CGATE signal and DGATE signal will not be negated for an overvoltage condition. Monitoring circuit 116 ensures that no further charge will enter battery 100 during an overvoltage condition by negating the LATCHOUT signal.

Still referring to FIGS. 5 and 6, monitoring circuit 400 also alerts battery microcontroller 300 when an overcharge current condition exists in battery 100. Monitoring circuit 400 accomplishes this by negating the THERM signal and the CGATE signal. The DGATE signal remains high provided all other conditions permit. Monitoring circuit 400 will not negate the CGATE signal until an overcharge current condition exists at least 2 to 3 seconds, thereby ensuring that if a pulse charge method is being used to charge the battery 100, a positive current pulse will not trip the overcharge current protection mechanism provided by monitoring circuit 400.

Monitoring circuit 400 also provides undervoltage and overdischarge current protection. When either an undervoltage or an overdischarge current condition exists at battery 100, microcontroller 400 negates the DGATE signal. Battery microcontroller 300, discussed below, must then determine whether the negation of the DGATE signal was triggered by an undervoltage or an overdischarge current condition at battery 100.

The undervoltage and overvoltage threshold points are set by resistors 404, 402 and 406. In the preferred embodiment, the undervoltage threshold is set at 2.0 volts, indicating a deeply discharged battery cell, and the overvoltage threshold is set at 4.29 volts which indicates an overvoltage condition of a battery cell. As discussed further below, the battery microcontroller 300 determines whether an undervoltage or overdischarge current condition exists by monitoring the VREF signal.

Now referring to FIG. 7A, shown is the initialization procedure that must proceed between power supply microcontroller 108 and RAM/RTC 112. In order for microcontroller 108 to indicate it wishes to communicate with RAM/RTC 112, microcontroller 108 must negate the normally high BDAT signal in order to send a RESET PULSE to the RAM/RTC 112. As shown in FIG. 7A, microcontroller 108 negates BDAT signal at time T0. Microcontroller 108 then releases the BDAT signal so that at time T1 the BDAT signal has once again reached its normally high state. The RESET PULSE is thus defined as the time interval from time T0 to time T1. The RESET PULSE has to be at least 480 µs in length, but the RESET PULSE cannot be longer than 960 µs. As can be seen from FIG. 7A, RAM/RTC 112 waits until time T2 to negate the BDAT signal, thereby providing the PRESENCE PULSE which indicates to microcontroller 108 that the RAM/RTC 112 has recognized the RESET PULSE and is ready to communicate with microcontroller 108. RAM/RTC 112 then negates the BDAT signal until time T3, thereby indicating the end of the PRESENCE PULSE. The PRESENCE PULSE has to be at least 60 µs in length, but the PRESENCE PULSE cannot be longer than 240 µs.

Now referring to FIG. 7B, FIG. 7B illustrates either a BDAT signal write "1" or a read "1" operation by microcontroller 108. In a read "1" operation by microcontroller 108, microcontroller 108 negates the BDAT signal at time T0 and holds the BDAT signal low until time T1. This indicates microcontroller 108 is ready to read a bit from the BDAT signal. The interval from time T0 to T1 must be greater than 1 µs. RAM/RTC 112 then asserts the BDAT signal so that at time T2 the BDAT signal is high. Microcontroller 108 then samples the BDAT signal at time T3, thereby reading a "1." For microcontroller 108 to read a "1," microcontroller 108 must sample the BDAT signal not later then 15 µs from time T0. Thus, for a read "1" operation, the interval from time T0 to time T3 must be less than 15 µs.

FIG. 7B similarly illustrates a write "1" by microcontroller 108. In order to let RAM/RTC 112 know of the pending write operation, microcontroller 108 must negate the BDAT signal at time T0. Microcontroller 108 then negates the BDAT signal until time T1 which must be greater than 1 µs. Microcontroller 108 must then assert the BDAT signal high within 15 microseconds after time T0 because RAM/RTC 112 reads the write operation within 15 µs to 60 µs after time T0.

FIG. 7C illustrates either a write "0" or a read "0" operation by microcontroller 108. In a write "0" operation, microcontroller 108 negates the BDAT signal at time T0. Microcontroller 108 must keep the BDAT signal negated until time T1. Microcontroller 108 should negate the BDAT signal for a minimum of 60 microseconds in order to indicate a "0." Thus, time T0 to time T2 should be at least 60 µs. Therefore, when the BDAT signal is sampled by RAM/RTC 112 at time T1, which is greater than 60 µs from time T0, a "0" will be detected by RAM/RTC 112.

In order for microcontroller 108 to read a "0," microcontroller 108 must once again negate the BDAT signal at time T0, thereby indicating microcontroller 108 is ready to read the BDAT signal. Microcontroller 108 must sample the line within 15 µs after negating the BDAT signal. The microcontroller 108 must sample the BDAT signal at time T1 which would not be greater then 15 µs from time T0.

When microcontroller 108 first communicates with RAM/RTC 112 after battery pack B has been installed in host computer system C, microcontroller 108 undergoes the initialization procedure described above with RAM/RTC 112. Thus, microcontroller 108 transmits a RESET PULSE, and RAM/RTC 112 responds with the PRESENCE PULSE.

After this initialization sequence, microcontroller 108 then transmits a RD_ROM command, which is preferably a binary sequence of "1"s and "0"s equalling 33h. This lets RAM/RTC 112 know that microcontroller 108 is ready to read the 8 bytes of data in the ROM of RTC/RAM 112. The first byte of ROM that will be transmitted by RAM/RTC 112 is a family code, FAM_CDE, for battery pack B.

Thus, the BDAT signal signature recognition procedure utilized by the preferred embodiment looks for the initialization procedure protocol and the transmitted command and data discussed above. In summary, first, battery microcontroller 300 monitors the BDAT signal for the initialization procedure; second, battery microcontroller 300 monitors the BDAT signal for the RD_ROM command; and finally, battery microcontroller 300 monitors the BDAT signal for the transmitted family code, FAM_CDE. If microcontroller 300 detects this communication sequence, then microcontroller 106 knows that battery pack B has been inserted into host computer system C.

Figure 8A:
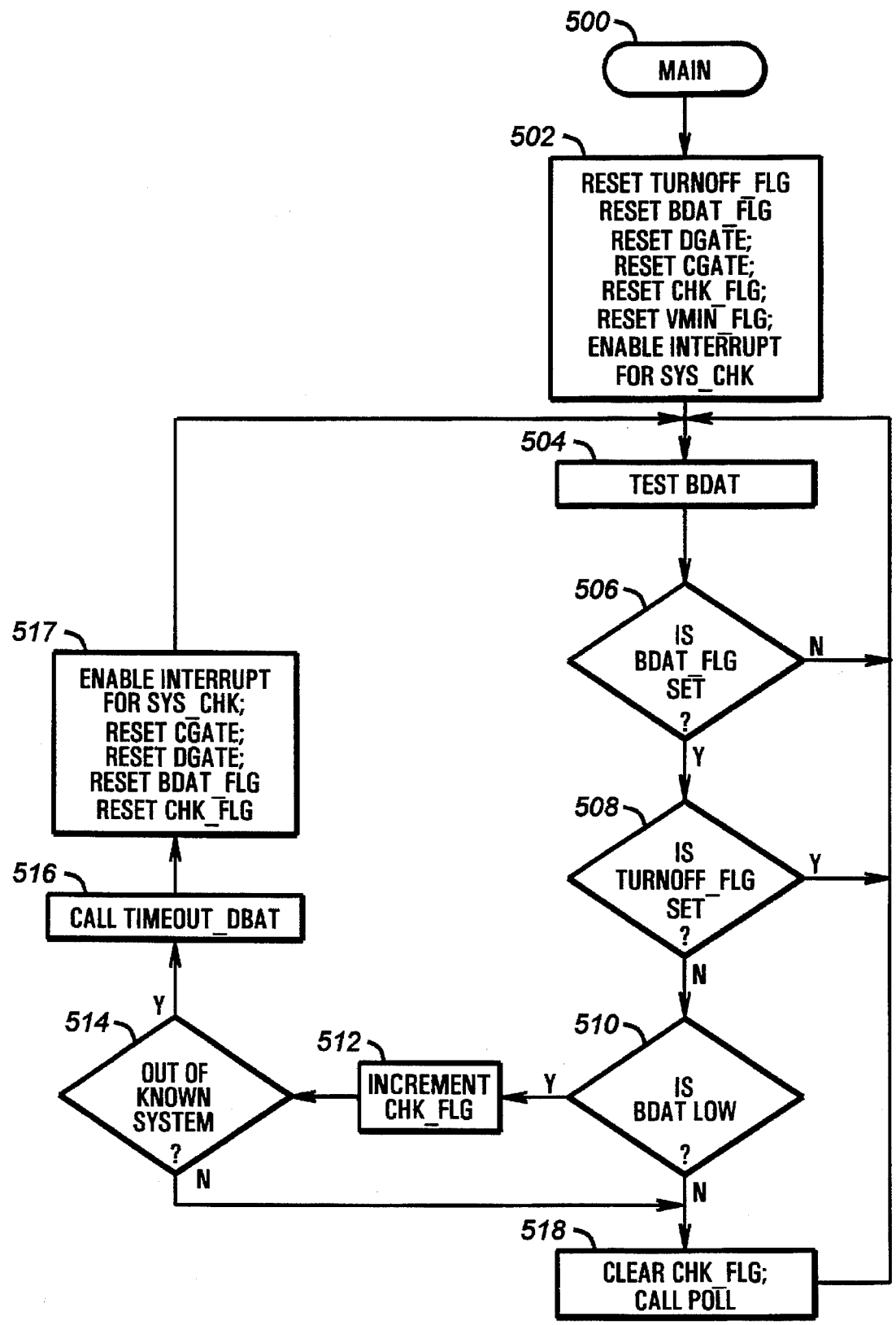
FIG. 8A is a flowchart illustration of a main routine that checks for insertion of the battery pack into the known host computer system.

Now referring to the algorithm of microcontroller 300 which monitors the communications of the BDAT signal, FIG. 8A is a flowchart illustrating a MAIN routine which calls a battery 100 monitoring routine, POLL, when battery pack B is in host computer system C. Referring now to FIG. 8A, operations begin at step 500 wherein the MAIN routine begins. Control transfers to step 502, where a TURNOFF_FLG is reset. The TURNOFF_FLG flag is set when battery pack B should be permanently turned off, thereby indicating a deeply discharged battery cell. A BDAT_FLG flag is also reset. When the BDAT_FLG flag is set, this indicates that battery pack B is in host computer system C. The DGATE signal and the CGATE signal are both reset, turning off transistor 200 and transistor 280 before microcontroller 300 determines whether battery pack B has been inserted into host computer system C. The interrupt for an interrupt service routine, SYS_CHK, is also enabled.

An interrupt is generated whenever a negative slope appears at the RB0_INT input of microcontroller 300; therefore when the BDAT signal pulses high, triggering a negative slope on the RB0_INT input, control will pass to the interrupt service routine, SYS_CHK. In step 502, a CHK_FLG flag is also reset. This flag is used to determine when battery pack B has been removed from host computer system C. Further, in step 502, a VMIN_FLG flag is reset. The VMIN_FLG flag is set whenever battery 100 has become discharged.

Control then transfers to step 504 where the BDAT signal is tested. Control then passes to step 506 where the BDAT_FLG flag is checked. If set, it indicates battery pack B is in host computer system C. If the BDAT_FLG flag is not set, control transfers back to step 504. If the BDAT_FLG flag is set, control transfers to step 508, where the TURNOFF_FLG is tested. If set, this indicates a deeply discharged battery, so, control transfers to step 504 as microcontroller 300 is waiting for battery pack B to be removed from host computer system C so that microcontroller 300 will be permanently powered down. If the TURNOFF_FLG flag has not been set, control transfers to step 510 where the check for the removal of battery pack B from host computer system C begins.

In step 510, microcontroller 300 determines whether the BDAT signal is low. Because the BDAT signal is normally high, the BDAT signal, in the preferred embodiment, will not stay low greater than 960 µs. If the BDAT signal is low, control transfers to step 512 where the CHK_FLG is incremented. Whenever the BDAT line is pulsed high again and produces a negative slope at the RB0_INT input, the SYS_CHK interrupt service routine will reset the CHK_FLG (see FIG. 8B); therefore, CHK_FLG is used to track how long the BDAT signal remains low.

Control then passes to step 514 where microcontroller 300 determines whether the BDAT signal has been negated for longer than 960 μs. If so, battery pack B has been removed from host computer system C, and control then passes to step 516, where a TIMEOUT_BDAT routine is called (discussed with FIG. 8C). Control then passes to step 517 wherein the interrupt for the SYS_CHK interrupt routine is enabled; the CGATE signal is reset; the DGATE signal is reset; the BDAT_FLG flag is reset; and the CHK_FLG flag is reset. Control then passes back to step 504. If the battery pack has not been removed from host computer system C or the BDAT signal is high, control transfers to step 518 wherein the CHK_FLG flag is reset and a POLL routine is called. Control then transfers back to step 504.

Figure 8B:
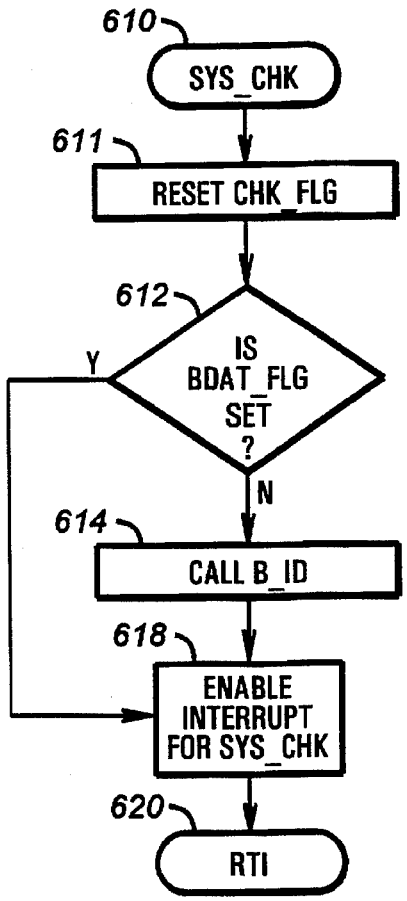
FIG. 8B is a flowchart illustration of a system check routine which checks for the characteristic signature of battery data communications between the known host computer system and the battery pack memory.

Now referring to the SYS_CHK interrupt service routine in FIG. 8B, control passes to step 610 whenever the BDAT signal is asserted. Control passes to step 611 where the CHK_FLG is reset. Control then passes to step 612 where microcontroller 300 tests the BDAT_FLG flag. If set, this indicates battery pack B is in host computer system C, so control passes to step 618. If the BDAT_FLG flag has not been set, control passes to step 614 where a B_ID routine is called which checks for the known communication signature on the BDAT signal. Control then passes from step 614 to step 618. In step 618 the interrupt for the SYS_CHK routine is once again enabled, and control then passes to step 620 where the interrupt service routine terminates.

Figure 8C:
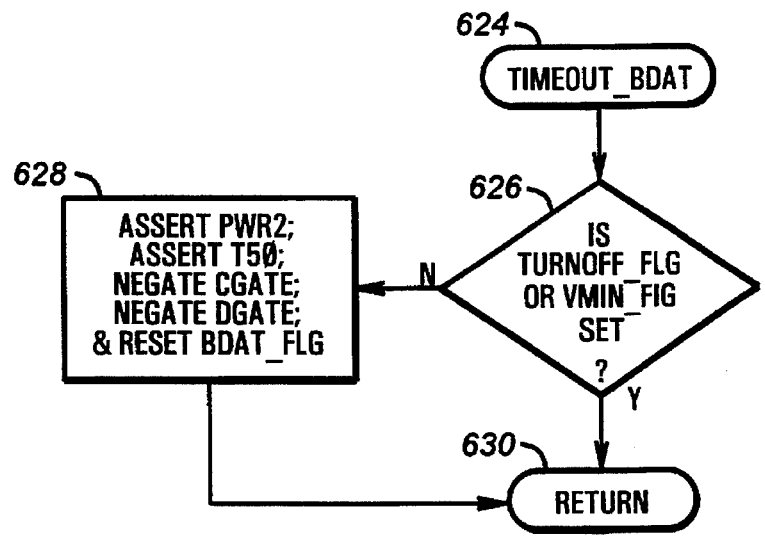
FIG. 8C is a flowchart illustration of a battery data timeout routine that checks for removal of the battery pack from the known host computer system.

FIG. 8C shows the TIMEOUT_BDAT routine which is called by the MAIN routine if the BDAT signal has been negated longer than 960 μs. Control begins at step 624 and then passes to step 626, where the battery microcontroller 300 checks if either the TURNOFF_FLG flag or the VMIN_FLG has been set. If either flag has been set, then trickle discharge transistor 274 is not turned on. If not, control passes to step 628 wherein the T50 signal is asserted to turn on trickle discharge transistor 274 which allows a trickle current to flow from battery pack B and to assert the ENABLE signal. Further, the PWR2 signal is negated, thereby deactivating unneeded circuitry. Both the DGATE and CGATE signals are negated, thereby turning off main discharge transistor 280 and charge transistor 200, respectively. Furthermore, the BDAT_FLG is reset, once again indicating battery pack B is not in host computer system C. Control then passes to step 630 which returns to the MAIN routine. If the TURNOFF_FLG is set, control transfers from step 626 to step 630.

Figure 9:
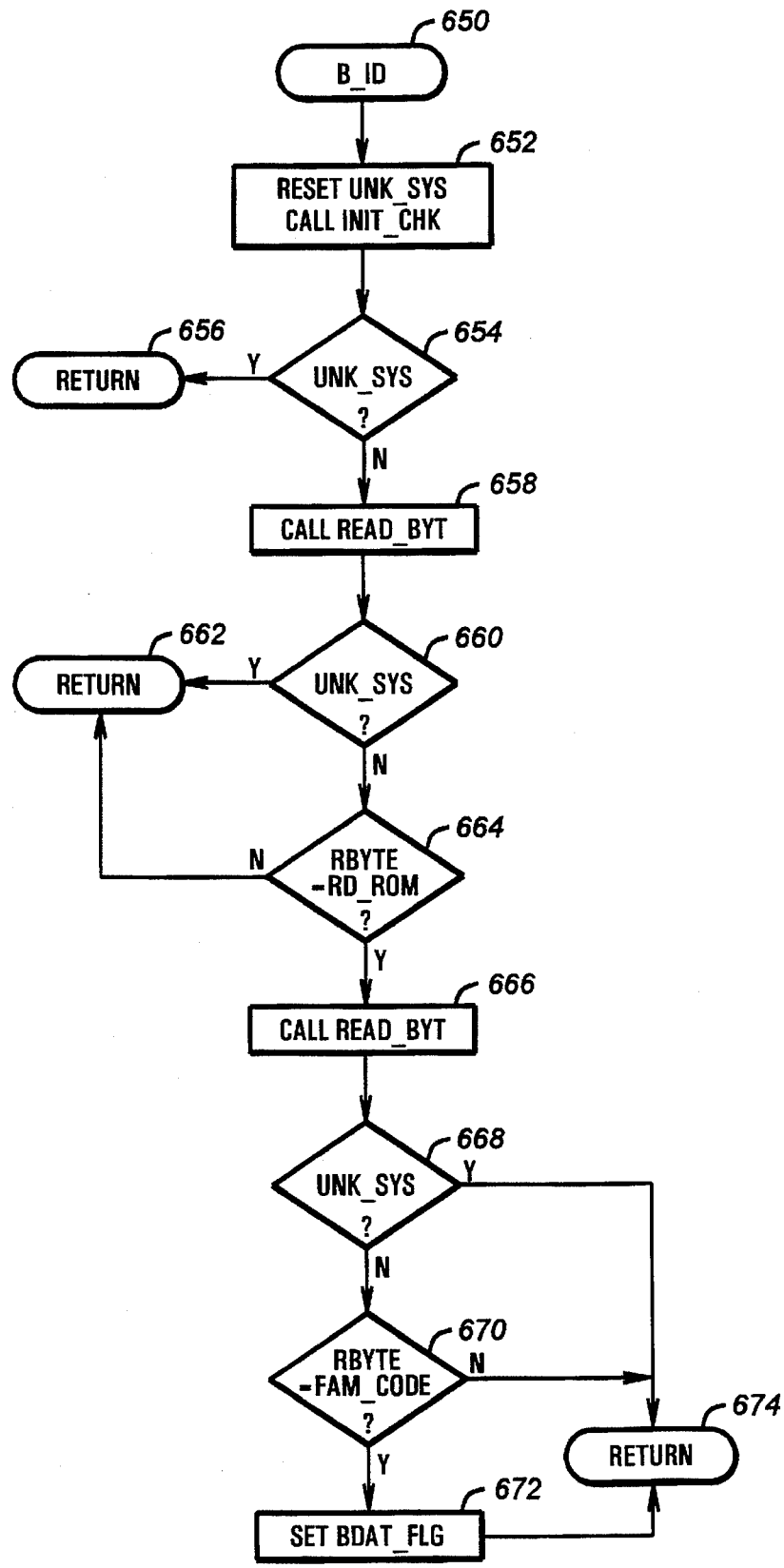
FIG. 9 is a flowchart illustration of a battery identification routine that verifies the characteristic signature of communications between the battery pack memory and the known host computer system.

FIG. 9 shows the B_ID routine which is called by the SYS_CHK routine to identify host computer system C. Control begins at step 650 and then passes to step 652 in which battery microcontroller 300 resets a UNK_SYS flag which is set when an unknown system is detected. Furthermore, in step 652 the INT_CHK routine is called which checks for the initialization procedure on the BDAT signal. If the initialization procedure is not detected between microcontroller 108 and RAM/RTC 112, the UNK_SYS flag is set. Control passes to step 654 wherein the status of the UNK_SYS flag is checked. If UNK_FLG has been set, indicating an unknown system, control passes to step 656 which returns to the SYS_CHK interrupt service routine. If the initialization procedure has been detected, control passes to step 658 which calls a READ_BYT routine, discussed in conjunction with FIG. 12, to read a byte, RBYTE, from the BDAT signal. Control then passes to step 660 which once again checks the UNK_SYS flag.

If an unknown system has been detected, control then passes to step 662 which returns to the SYS_CHK routine; however, if an unknown system has not been detected, then control passes to step 664 where the battery microcontroller 300 determines if the byte that was read by READ_BYT, RBYTE, was the RD_ROM command. If not, control returns to step 662 which returns to the SYS_CHK routine. If the RD_ROM command was detected, control passes to step 666 wherein READ_BYT is called again. Control then passes to step 668 which checks if battery pack B is in an unknown system. If so, control passes to step 674 which returns to the SYS_CHK routine. If not, control passes to step 670 which checks if RBYTE is the family code, FAM_CODE. If not, control passes to step 674 which returns to the SYS_CHK routine without setting the BDAT_FLG flag. If RBYTE is the family code, FAM_CODE, then battery pack B has been placed in host computer system C. Thus, control passes to step 672 where the BDAT_FLG flag is set, indicating battery pack B is in host computer system C, and then control passes to step 674 which returns to the SYS_CHK routine.

Figures 10, 11A:
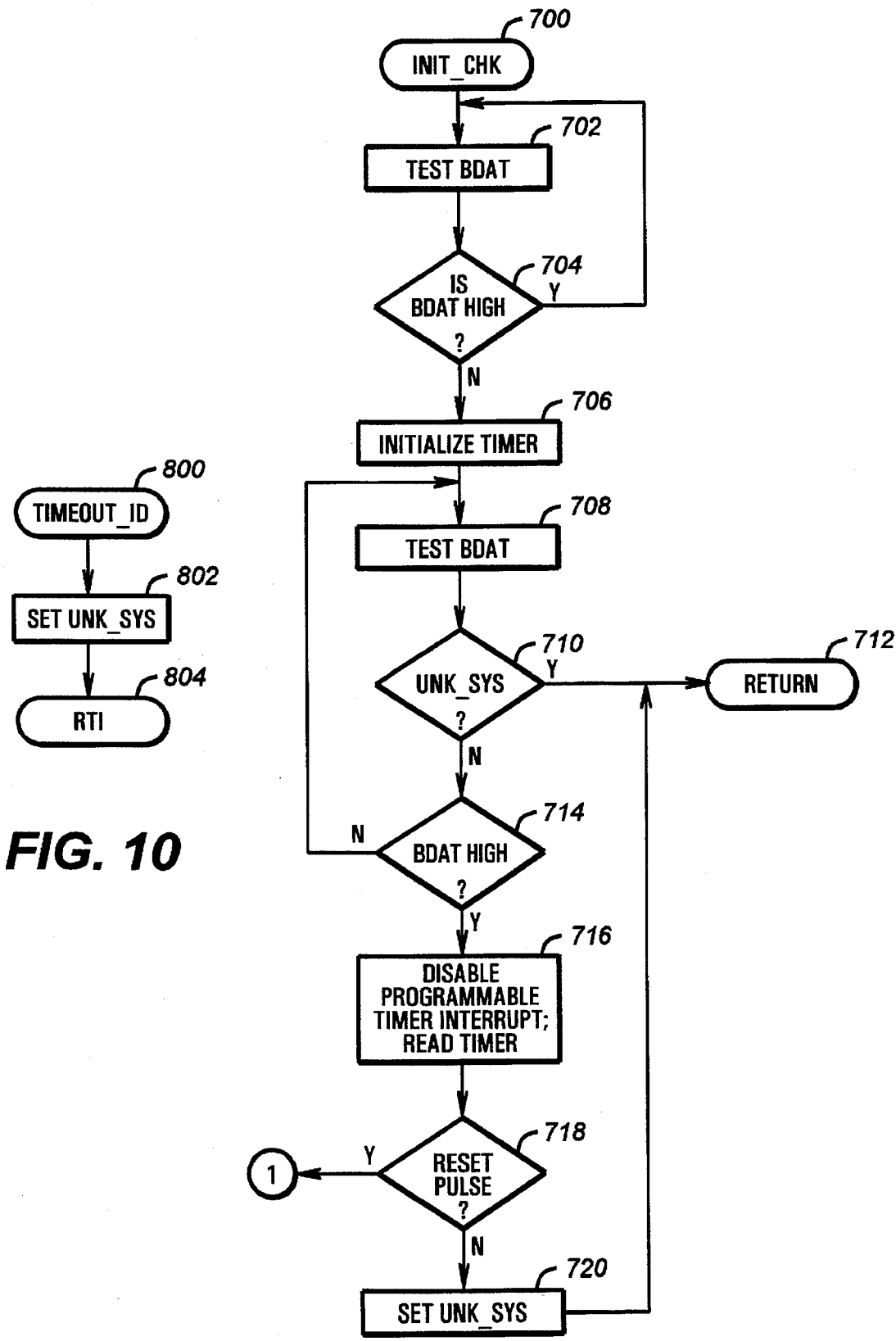
FIG. 10 is a flowchart illustration of a timeout verification routine which is used to verify the initialization procedure of battery data communications.
FIGS. 11A and 11b are flowchart illustrations of an initialization protocol check routine that checks for the initialization protocol of the battery data signal.
Figure 11B:
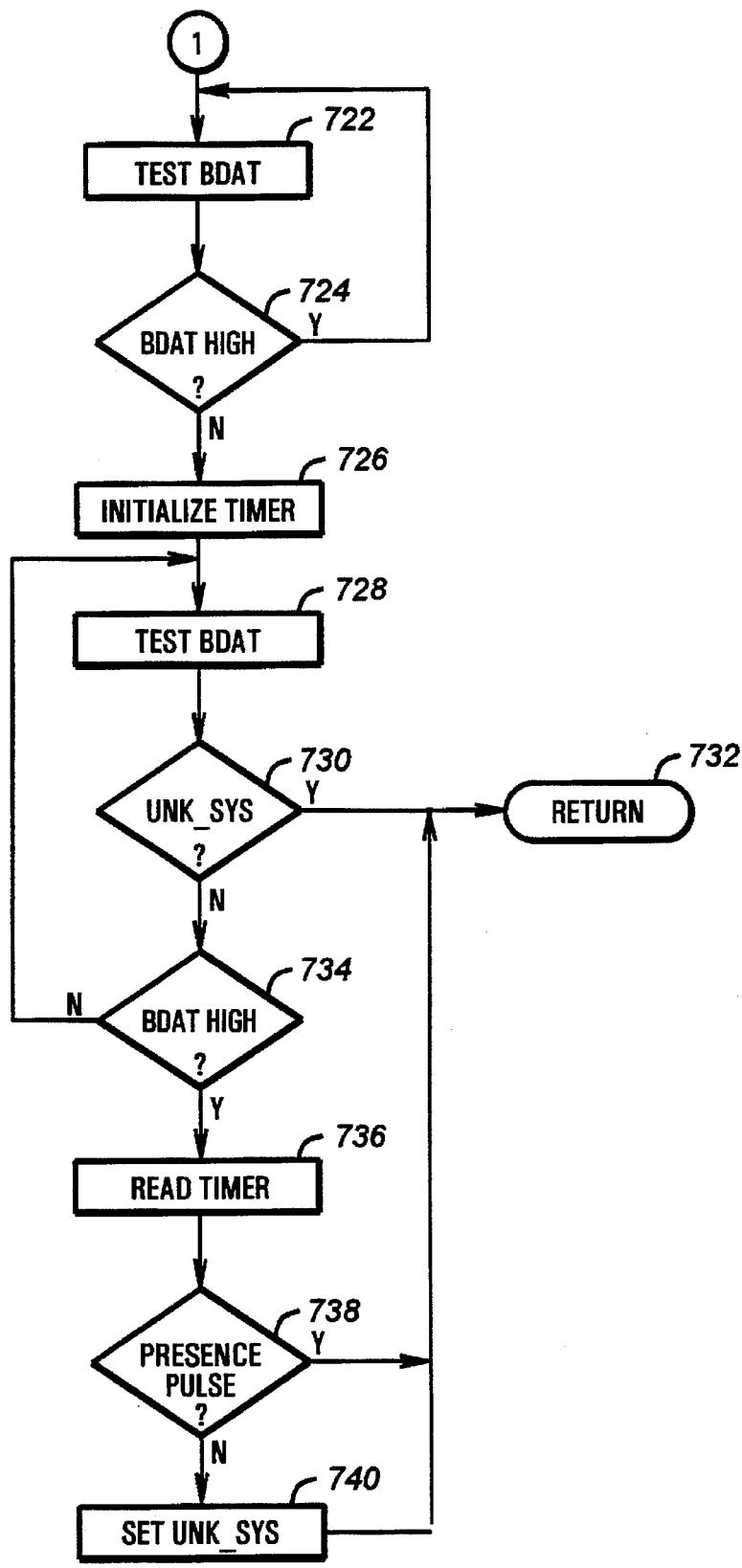

FIGS. 11A and 11B illustrate the flowchart of the initialization procedure check routine, INIT_CHK, which checks for the initialization procedure which must proceed any communication between microcontroller 108 and RAM/RTC 112. The initialization procedure check routine, INIT_CHK, begins execution at step 700. Control then transfers to step 702 where the BDAT signal is tested. Control then transfers to step 704 where if the BDAT signal is high, its normal state, control then transfers back to step 702. If BDAT is low, control instead transfers to step 706 where a programmable timer of microcontroller 300 is initialized to trigger an interrupt whenever the timer overflows. An interrupt service routine, TIMEOUT_ID discussed in conjunction with FIG. 10, services the interrupt. When the BDAT signal is first negated, the time when BDAT is negated to when BDAT is asserted should be consistent with the RESET PULSE.

Thus, the programmable timer is initialized to generate an interrupt after the maximum allowable time for the RESET PULSE. Referring to FIG. 10, the TIMEOUT_ID interrupt service routine sets the UNK_SYS flag when this occurs. Referring back to FIG. 11A, control transfers to step 708 where BDAT is once again tested. Control then transfers to step 710 where if UNK_SYS has been set, control then transfers to step 712 which returns to the B_ID routine. If not, control then transfers to step 714 where microcontroller 300 determines if the BDAT signal is high. If not, then control transfers back to step 708. If BDAT is high, indicating the potential detection of the RESET PULSE, control then transfers to step 716 where the value of the programmable timer is read, and the timer interrupt is disabled. Control then transfers to step 718 where the timer is evaluated to see if the power supply microcontroller 108 has transmitted a RESET PULSE. If so, control then transfers to step 722. If a RESET PULSE was not detected, then control transfers to step 720 where the UNK_SYS flag is set indicating an unknown system, and control transfers to step 712, which returns to the B_ID routine.

If control was transferred to step 722, then the RESET PULSE was detected. In step 722 (FIG. 11B) the BDAT signal is once again tested. Control then transfers to step 724 where if the BDAT signal is high, control then transfers back to step 722 to once again test the BDAT signal. If BDAT is high, then control transfers to step 726 where battery microcontroller 300 initializes the timer to generate an interrupt when the timer overflows. The timer will overflow when the maximum allowable time for a PRESENCE PULSE has passed. The TIMEOUT_ID routine services the interrupt generated by the timer. Control then passes to step 728 where battery microcontroller 300 tests the BDAT signal. Control then transfers to step 730 where battery microcontroller 300 determines if an unknown system has been detected by testing UNK_SYS. If so, control then transfers to step 732 which returns to the B_ID routine.

If an unknown system has not been detected, then control passes from stop 730 to step 734, which determines if BDAT is high, and if not, then control passes back to step 728 wherein BDAT is once again tested. If BDAT is high at step 734, then control passes to step 736 where microcontroller 300 reads the value of the timer. Control then passes to step 738 where if a PRESENCE PULSE was detected then control transfers back to step 732 where control returns to the B_ID routine. If a PRESENCE PULSE was not detected, then control passes to step 740 where the UNK_SYS flag is set, and control then proceeds to step 732.

FIG. 10 shows the TIMEOUT_ID routine which is used to set the UNK_SYS flag by functioning as an interrupt service routine which services the timer overflow interrupt. Referring now to FIG. 10, step 800 is called to service the interrupt generated by the timer. Control then transfers to step 802 where the UNK_SYS flag is set. Control then transfers to step 804 which terminates the interrupt service routine.

Figure 12:
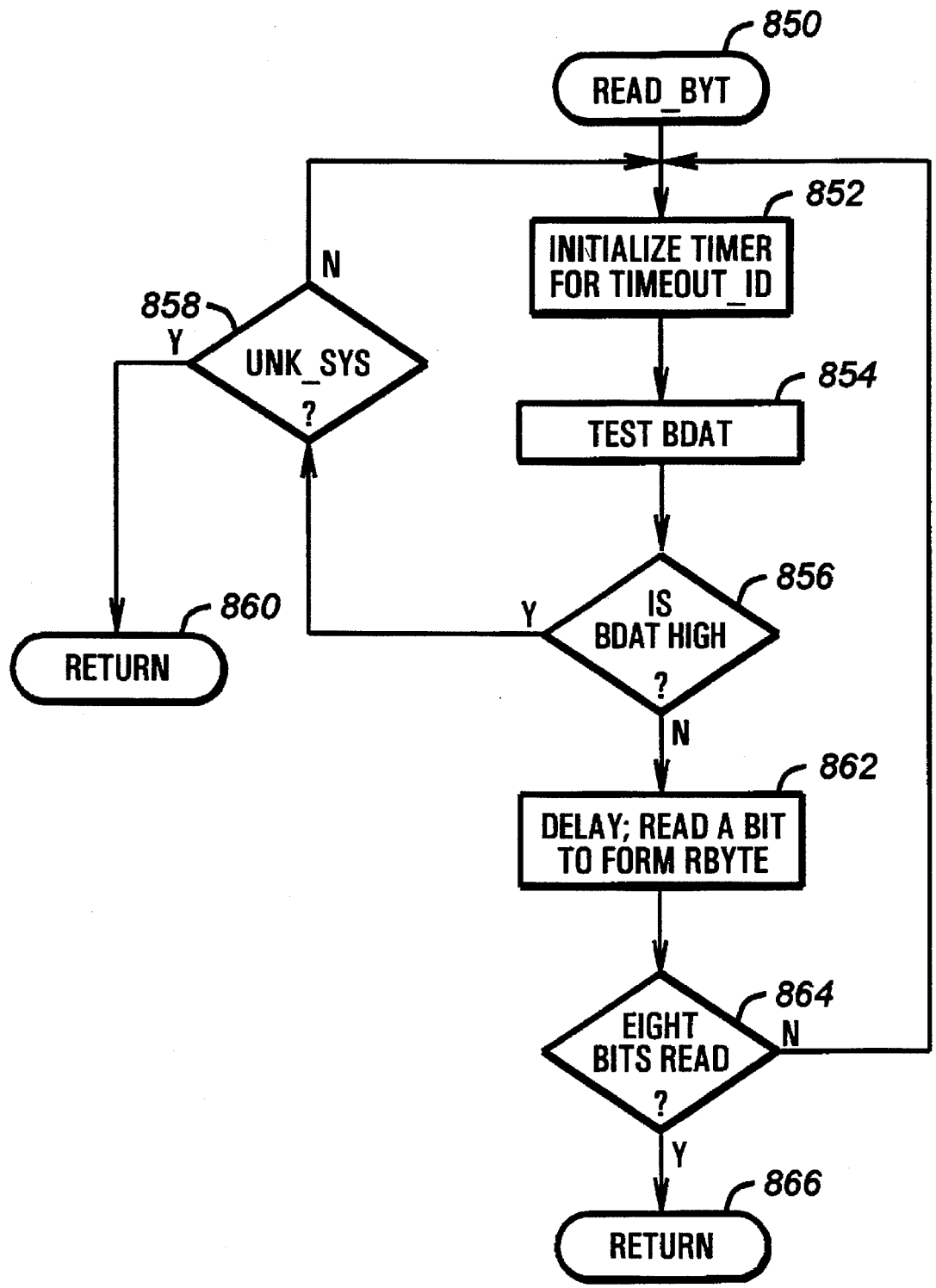
FIG. 12 is a flowchart illustration of a read byte routine that reads a byte from the battery data signal.

Referring now to FIG. 12, shown is the READ_BYT routine which reads a byte of data, RBYTE, from the BDAT signal. This routine begins at step 850 where the READ_BYT routine has been called by the B_ID routine. Control then transfers to step 852 where the programmable timer is initialized so that an interrupt will be generated if a low BDAT signal is not detected in a time. The TIMEOUT_ID interrupt service routine services the timer overflow interrupt. The negation of the BDAT signal indicates power supply microcontroller 108 is ready to read or write a bit of data. The first time is set to 40 seconds since power supply microcontroller 108 should respond within 27 seconds. Control then transfers to step 854, which tests the BDAT signal. Control then transfers to step 856, which evaluates whether BDAT is high, and if so, control transfers to step 858 where microcontroller 300 determines if UNK_SYS has been set, which would be caused by the interrupt service routine TIMEOUT_ID routine being called. If battery pack B is in an unknown system, then control is transferred to step 860 which returns to the B_ID routine. If battery pack B is in host computer system C, then control transfers back to step 852. If BDAT is low at step 856, then control transfers to step 862, where a delay is generated, the length of which depends on whether a write or a read operation by microcontroller 108 is to be detected.

As discussed earlier in the discussion of FIGS. 7B and 7C, for the detection of a read "1" or "0" by microcontroller 108, microcontroller 300 must sample the BDAT signal within 15 µs after the BDAT signal is first negated. For the detection of a write "1" or "0", the BDAT signal must be sampled 15 µs to 60 µs after the BDAT signal is first negated. Thus, in step 862 a the BDAT signal is sampled at the appropriate time to form RBYTE. Control then transfers to step 864 where the microcontroller 300 evaluates whether 8 bits have been read. If so, then control transfers to step 866 where control returns to B_ID which then evaluates RBYTE. If 8 bits have not been read, then control transfers back to step 852 to read more bits.

Figure 13:
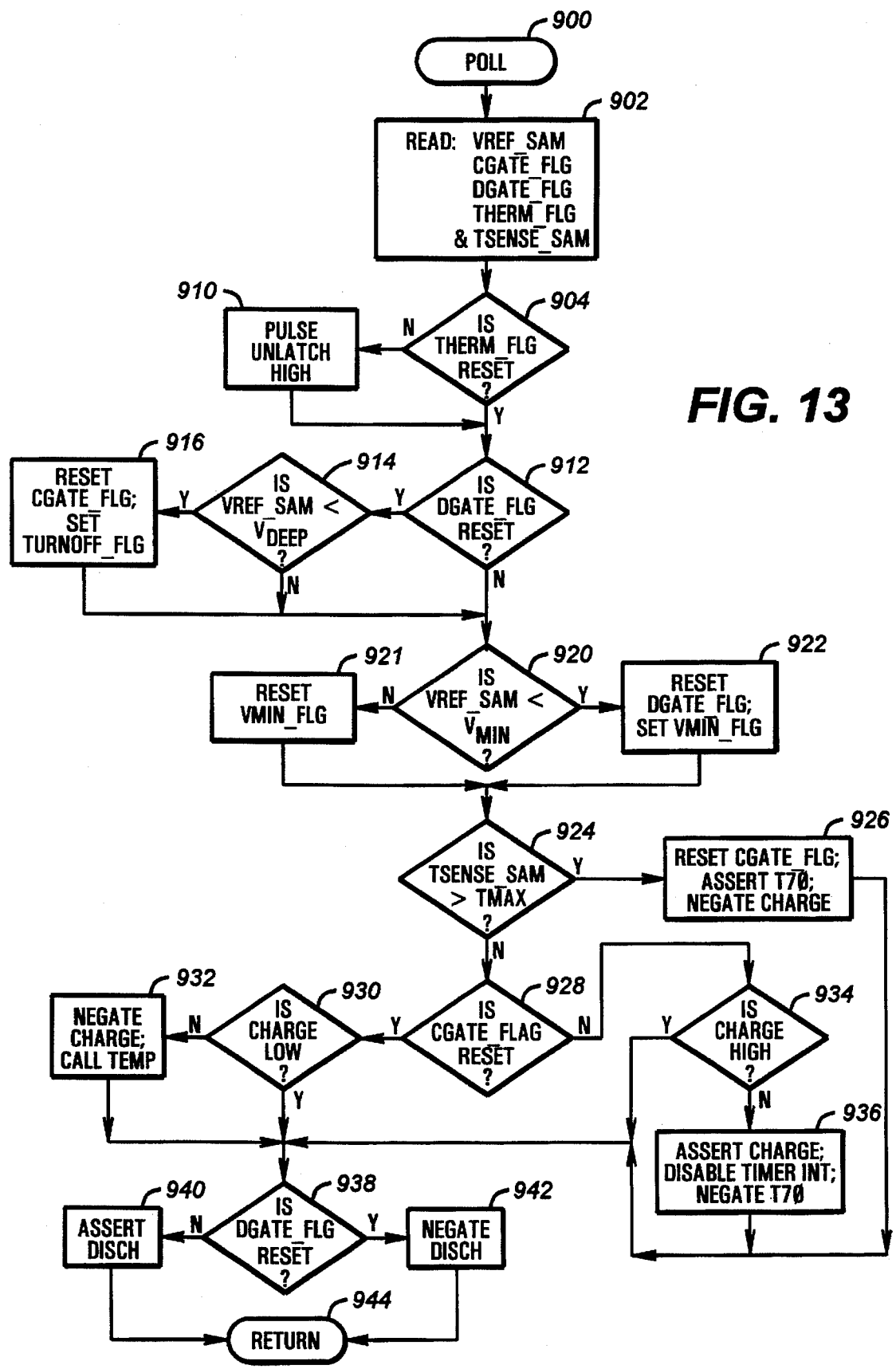
FIG. 13 is a flowchart illustration of a poll routine that utilizes monitoring circuitry to control any charge entering or leaving the battery pack.

Now referring to FIG. 13, shown is the POLL routine which examines the state of battery 100 and turns on and off charge transistor 200, trickle discharge transistor 274 and main discharge transistor 280 accordingly. The POLL routine begins at step 900. Control transfers to step 902 where an A/D converter of battery microcontroller 300 reads the VREF, the CGATE, the DGATE, the THERM and the TSENSE signals and stores their digital values in a VREF_SAM, a CGATE_FLG, a DGATE_FLG, a THERM_FLG and a TSENSE_SAM register respectively. In the preferred embodiment, the condition of battery 100 is measured by monitoring circuit 400 for approximately 1 µs every second. Control transfers to step 904 where microcontroller 300 determines if THERM_FLG is reset. If so, then either an overvoltage condition exists at a battery cell of battery 100 or an overcharge current condition exists at battery 100. The monitoring circuit 400 asserts or negates the CGATE signal as discussed in conjunction with FIG. 4. If THERM_FLG is set, control transfers to step 910 where the UNLATCH signal is pulsed high. This ensures that if charge controller 426 has negated the LATCHOUT signal during a momentary overvoltage condition at battery 100, transistor 236 will once again be turned on if an overvoltage condition does not presently exist.

Control then transfers to step 912 where battery microcontroller 300 checks whether the DGATE_FLG flag is low. If so, then either battery 100 is deeply discharged or an overdischarge current exists in battery 100. If DGATE_FLG is low, then control transfers to step 914 where the microcontroller 300 determines whether the VREF_SAM flag is less than $V_{DEEP}$, where $V_{DEEP}$ is the value of VREF when a battery cell of battery 100 is deeply discharged. If VREG_SAM is greater than $V_{DEEP}$, then no cell of battery 100 is deeply discharged, and control transfers to step 920. If a deeply discharged battery cell does exist, control instead transfers to step 916 where the CGATE_FLG flag is reset and the TURNOFF_FLG flag is set, thereby permanently blocking the VBAT– and VBAT+ terminals of battery pack B. Control then transfers to step 920. In step 920, battery microcontroller 300 determines whether VREF_SAM is less than a discharged voltage threshold, $V_{MIN}$, indicating a discharged battery. If so, control transfers to step 922 where the DGATE_FLG flag is reset and the VMIN_FLG flag is set. Control then transfers to step 924. If the VREF_FLG flag is greater than $V_{MIN}$, then control passes from step 920 to step 921 where the VMIN_FLG flag is reset. Control then transfers to step 924.

In step 924, the microcontroller 300 determines if TSENSE_SAM is greater than a maximum temperature threshold, $T_{MAX}$, thereby indicating an over temperature condition at battery 100. If so, control transfers to step 926 wherein the CGATE_FLG flag is reset; the T70 signal is asserted, thereby indicating an overtemperature condition to power supply microcontroller 108; and the CHARGE signal is negated. If TSENSE_FLG is less than $T_{MAX}$ then control transfers from step 924 to step 928 where microcontroller 300 evaluates whether CGATE_FLG is reset. If so, control transfers to step 930 where the microcontroller 300 determines if the CHARGE signal is low, and if not, then control transfers to step 932 where the CHARGE signal is negated and a TEMP routine is called which pulses the T50 signal to communicate to power supply microcontroller 108 that charging has been terminated. Power supply microcontroller 108 can then update the RAM/RTC 112 and terminate charging in an orderly fashion. Control then transfers from step 932 to step 938.

If the CHARGE signal is low in step 930, then control transfers to step 938. In step 928 if the CGATE_FLG is set, then control transfers to step 934 wherein the CHARGE signal is evaluated. If the CHARGE signal is high then control transfers to step 938. If the CHARGE signal is low then control transfers from step 934 to step 936 where battery microcontroller 300 asserts the CHARGE signal; disables the timer interrupt which is used to provide the pulse width modulated T50 signal (discussed in conjunction with FIGS. 14A and 14B); and negates the T50 signal. This ensures that battery 100 can once again be charged. Control then transfers from step 936 to step 938.

In step 938, if DGATE_FLG is set then control transfers to step 940 where the DISCH signal is asserted, and then control transfers to step 944. If DGATE_FLG is reset, then control transfers from step 938 to step 942 where the DISCH signal is negated, and control then transfers to step 944. In step 944 control returns to the MAIN routine.

Figure 14A:
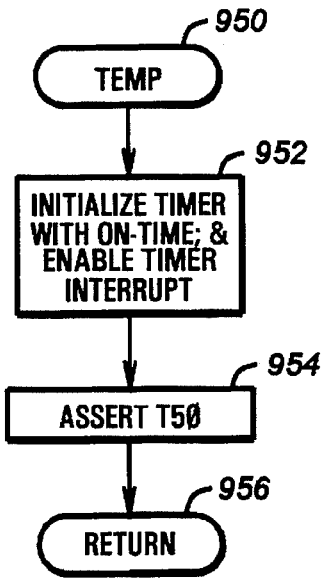
FIG. 14A is a flowchart illustration of a temperature routine that manipulates the battery pack thermistor signals to indicate charge turn-off to the known system.
Figure 14B:
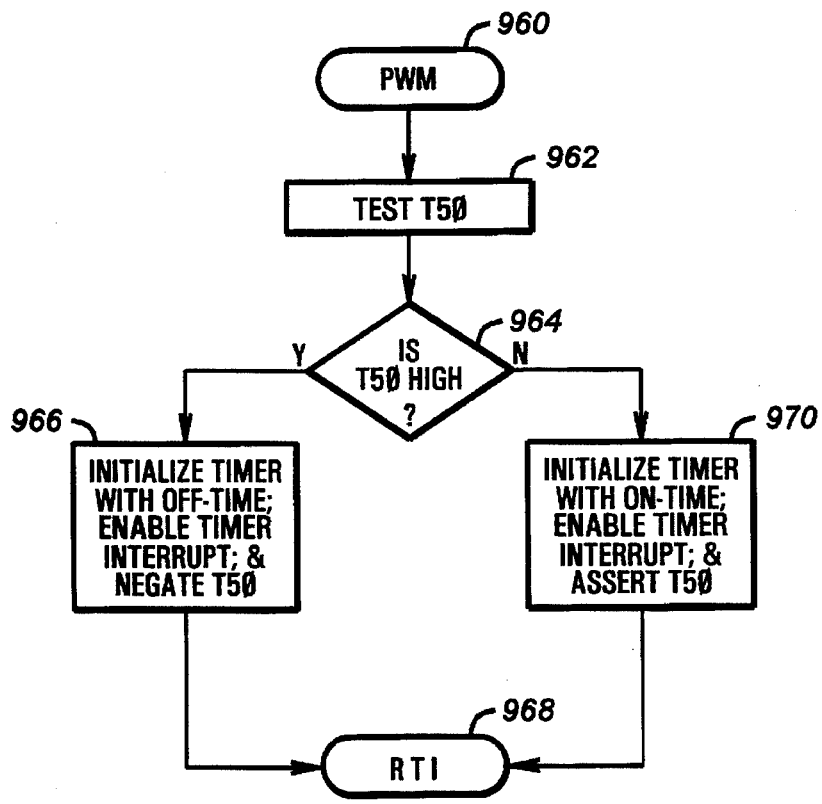
FIG. 14B is a flowchart illustration of a pulse width modulation routine which controls the pulse width modulation of the battery pack thermistor signals.

Shown in FIGS. 14A and 14B are the TEMP routine and a PWM routine, respectively. These routines are used to pulse the T50 signal, thereby indicating a rise in temperature, which allows power supply microcontroller 108 to terminate charge in an orderly fashion, thereby updating the charge information to RAM/RTC 112. Referring now to FIG. 14A, the TEMP routine is entered at step 950. Control then transfers to step 952 where the programmable timer is initialized with the on time of the pulse width modulated T50 signal, and the timer overflow interrupt is enabled. Control then transfers from step 952 to step 954 where the T50 signal is asserted. Control then transfers to step 956 where control returns to the POLL routine.

Referring now to FIG. 14B, the PWM routine is an interrupt service routine used to service the interrupt generated by a timer overflow. Initially, the programmable timer is initialized by the TEMP routine, and the PWM routine is subsequently called by timer overflows as a result of timer indications as provided in the PWM routine. The PWM routine is entered at step 960. Control transfers to step 962 where the T50 signal is tested. Control then transfers to step 964 where the T50 signal is high, control then transfers to step 966 where the programmable timer is initialized with the off-time; the timer is overflow interrupt enabled; and the T50 signal is negated. Control then passes from step 966 to step 968 were the PWM routine terminates. In step 964 if the T50 signal is low, then control transfers to step 970 where the programmable timer is initialized with the on time; the overflow interrupt is enabled; and the T50 signal is asserted. Control then transfers from step 970 to step 968 where control returns from the interrupt.

The foregoing disclosure and description of the invention are illustrated and explanatory thereof, and various changes in the size, shape, materials, components, circuit elements, wiring connections and contacts as well as in the details of the illustrated circuitry and construction may be made without departing from the spirit and scope of the invention.

We claim:

1. A removable battery pack for use in a system, the battery pack having first and second terminals which it disables when the system is an unknown system, the system providing a data signal with predetermined battery data when the system is a known system, the battery pack comprising:

a battery with a voltage and with first and second battery terminals;

a first switch for enabling and disabling the first battery pack terminal of the battery pack, said first switch having a first series switched path and a control terminal for activating the first series switched path, the first series switched path coupled between the first battery terminal and the first battery pack terminal; and a controller for receiving the data signal and for providing a first control signal to said first switch, the first control signal provided to turn on the first series switched path when the data signal from the system includes predetermined battery data and turn off the first series switched path when the data signal from the system is either nonexistent or does not include predetermined battery data.

2. The battery pack of claim 1, further comprising:

a current limiter for regulating a trickle discharge current provided by the battery pack, said current limiter coupled in parallel with said first series switched path; and a second switch for controlling the trickle discharge current provided by the battery pack, said second switch having a second series switched path and a control terminal for activating the second series switched path, the second series switched path coupled in series with said current limiter and in parallel with said first series switched path, wherein said controller further provides a second control signal to said second switch, the second control signal provided to turn on the second series switched path when the data signal from the system is nonexistent or does not include predetermined battery data and to turn off the second series switched path when the data signal from the system includes predetermined battery data.

3. The removable battery pack of claim 2, further comprising:

a monitoring circuit coupled to said battery for determining the voltage of said battery and for providing a battery pack disable signal to said controller, the battery pack disable signal provided to indicate when the voltage of said battery is below a deeply discharged threshold, and wherein said controller permanently turns off the second series switched path when said controller receives the battery pack disable signal.

4. The removable battery pack of claim 3, wherein the deeply discharged threshold is 2.0 volts.

5. The removable battery pack of claim 2, wherein said second switch is a metal-oxide-semiconductor field-effect-transistor.

6. The removable battery pack of claim 2, wherein said current limiter is a resistor.

7. The removable battery pack of claim 1, further comprising:

a monitoring circuit coupled to said battery for determining the Voltage of said battery and for providing a discharge disable signal to said controller, the discharge disable signal provided to indicate when the voltage of said battery is below a discharged threshold, and wherein said controller turns off the first series switched path when said controller receives the discharge disable signal.

8. The removable battery pack of claim 7, wherein the discharged threshold is 2.7 volts.

9. The removable battery pack of claim 1, further comprising:

a monitoring circuit coupled to said battery for determining the voltage of said battery and for providing a charge disable signal to said controller, the charge disable signal provided to indicate when the voltage of said battery is above an overvoltage threshold, and wherein said controller turns off the first series switched path when said controller receives the charge disable signal.

10. The removable battery pack of claim 9, wherein the overvoltage threshold is 18 volts.

11. The removable battery pack of claim 1, further comprising:

a monitoring circuit coupled to said battery for determining the voltage of said battery and for providing a battery pack disable signal to said controller, the battery pack disable signal provided to indicate when the voltage of said battery is below a deeply discharged threshold, and wherein said controller permanently turns off the first series switched path when said controller receives the battery pack disable signal.

12. The removable battery pack of claim 11, wherein the deeply discharged threshold is 2.0 volts.

13. The removable battery pack of claim 1, wherein said first switch is a metal-oxide-semiconductor field-effect-transistor.

14. A removable battery pack for use in a system, the battery pack having first and second terminals which it disables when the system is an unknown system, the system providing a data signal with predetermined battery data when the system is a known system, the battery pack comprising:

a battery with a voltage and with first and second battery terminals;

a first switch for enabling and disabling the first battery pack terminal of the battery pack, said first switch having a first series switched path and a control terminal for activating the first series switched path, the first series switched path coupled between the first battery terminal and the first battery pack terminal;

a second switch for enabling and disabling the second battery pack terminal, said second switch having a second series switched path and a control terminal for activating the second series switched path, the second series switched path coupled between the second battery terminal and the second battery pack terminal; and a controller for receiving the data signal from the system and for providing a first control signal to said first switch and a second control signal to said second switch, the first control signal provided to turn on the first series switched path when the data signal from the system includes predetermined battery data and turn off the first series switched path when the data signal from the system is either nonexistent or does not include predetermined battery data, the second control signal provided to turn on the second series switched path when the data signal from the system includes predetermined battery data and turn off the second series switched path when the data signal from the system is either nonexistent or does not include predetermined battery data.

15. The battery pack of claim 14, further comprising:
a current limiter for regulating a trickle discharge current provided by the battery pack, said current limiter coupled in parallel with said first series switched path; and a third switch for controlling the trickle discharge current provided by the battery pack, said third switch having a third series switched path and a control terminal for activating the third series switched path, the third series switched path coupled in series with said current limiter, wherein said controller further provides a third control signal to said third switch, the third control signal provided to turn on the third series switched path when the data signal from the system is either nonexistent or does not include predetermined battery data and turn off the third series switched path when the data signal from the system includes predetermined battery data.

16. The removable battery pack of claim 15, further comprising:

a monitoring circuit coupled to said battery for determining the voltage of said battery and for providing a battery pack disable signal to said controller, the battery pack disable signal provided to indicate when the voltage of said battery is below a deeply discharged threshold, and wherein said controller permanently turns off the third series switched path when said controller receives the battery pack disable signal.

17. The removable battery pack of claim 16, wherein said current limiter is a resistor.

18. The removable battery pack of claim 15, wherein said third switch is a metal-oxide-semiconductor field-effect transistor.

19. The removable battery pack of claim 14, further comprising:

a monitoring circuit coupled to said battery for determining the voltage of said battery and for providing a discharge disable signal to said controller, the discharge disable signal provided to indicate when the voltage of said battery is below a discharged threshold, and wherein said controller turns off the second series switched path when said controller receives the discharge disable signal.

20. The removable battery pack of claim 19, wherein the discharged threshold is 2.7 volts.

21. The removable battery pack of claim 14, further comprising:

a monitoring circuit coupled to said battery for determining the voltage of said battery and for providing a charge disable signal to said controller, the charge disable signal provided to indicate when the voltage of said battery is above an overvoltage threshold, and wherein said controller turns off the first series switched path when said controller receives the charge disable signal.

22. The removable battery pack of claim 21, wherein the overvoltage threshold is 18 volts.

23. The removable battery pack of claim 14, further comprising:

a monitoring circuit coupled to said battery for determining the voltage of said battery and for providing a battery pack disable signal to said controller, the battery pack disable signal provided to indicate when the voltage of said battery is below a deeply discharged threshold, and wherein said controller permanently turns off the first series switched path when said controller receives the battery pack disable signal.

24. The removable battery pack of claim 23, wherein the deeply discharged threshold is 2.0 volts.

25. The removable battery pack of claim 14, further comprising:

a monitoring circuit coupled to said battery for determining the voltage of said battery and for providing a battery pack disable signal to said controller, the battery pack disable signal provided to indicate when the voltage of said battery is below a deeply discharged threshold, and wherein said controller permanently turns off the second series switched path when said controller receives the battery pack disable signal.

26. The removable battery pack of claim 25, wherein the deeply discharged threshold is 2.0 volts.

27. The removable battery pack of claim 14, wherein said second switch is a metal-oxide-semiconductor field-effect transistor.

28. The removable battery pack of claim 14, further including:
a first diode for providing a discharge current path, said first diode having an anode coupled to the positive battery terminal and a cathode coupled to the first battery pack terminal.

29. The removable battery pack of claim 14, further including:
a second diode for providing a charge current path, said first diode having an anode coupled to the negative battery terminal and a cathode coupled to the second battery pack terminal.

30. The removable battery pack of claim 14, further comprising:
a monitoring circuit coupled to said battery for determining the current in said battery and for providing a discharge disable signal to said controller, the discharge disable signal provided to indicate when the current in said battery exceeds an overdischarge current threshold, and
wherein said controller turns off the second series switched path when said controller receives the discharge disable signal.

31. The removable battery pack of claim 14, wherein said first switch is a metal-oxide-semiconductor field-effect-transistor.

32. The removable battery pack of claim 14, further comprising:
a monitoring circuit coupled to said battery for determining the current in said battery and for providing a charge disable signal to said controller, the charge disable signal provided to indicate when the current in said battery exceeds an overcharge current threshold, and
wherein said controller turns off the first series switched path when said controller receives the charge disable signal.

33. The battery pack of claim 32,
wherein said monitoring circuit further provides a discharge disable signal to said controller to indicate when the current in said battery exceeds an overdischarge current threshold, and
wherein said controller turns off the second series switched path when said controller receives the discharge disable signal from said monitoring circuit.

34. The battery pack of claim 33,
wherein said monitoring circuit further determines the voltage of said battery and provides a battery pack disable signal to said controller to indicate when the voltage of said battery is below a deeply discharged threshold, and
wherein said controller permanently turns off the first series switched path, the second series switched path and the third series switched path when said controller receives the battery pack disable signal from said monitoring circuit.

35. The battery pack of claim 34,
wherein said monitoring circuit further provides the charge disable signal to indicate when the voltage of said battery is above an overvoltage threshold.

36. The battery pack of claim 35,
wherein said monitoring circuit further provides the discharge disable signal to indicate when the voltage of said battery is below a discharged threshold.

37. The battery pack of claim 36, wherein the overvoltage threshold voltage is 18 volts, the discharged threshold is 2.7 volts, and the deeply discharged threshold is 2.0 volts.

* * * * *